United States Patent
Babić

(10) Patent No.: US 11,162,331 B2
(45) Date of Patent: Nov. 2, 2021

(54) SYSTEM AND METHOD FOR CONTROLLING OIL AND/OR GAS PRODUCTION

(71) Applicant: Agile Analytics Corp., Airdrie (CA)

(72) Inventor: Andrej Babić, Airdrie (CA)

(73) Assignee: Agile Analytics Corp., Airdrie (CA)

(*) Notice: Subject to any disclaimer, the term of this patent is extended or adjusted under 35 U.S.C. 154(b) by 570 days.

(21) Appl. No.: 15/976,049

(22) Filed: May 10, 2018

(65) Prior Publication Data
US 2019/0345797 A1 Nov. 14, 2019

(51) Int. Cl.
| | |
|---|---|
| *E21B 41/00* | (2006.01) |
| *E21B 47/06* | (2012.01) |
| *G06Q 50/02* | (2012.01) |
| *E21B 49/08* | (2006.01) |
| *E21B 43/12* | (2006.01) |
| *G06Q 10/06* | (2012.01) |
| *E21B 47/07* | (2012.01) |
| *E21B 47/008* | (2012.01) |

(52) U.S. Cl.
CPC ........ *E21B 41/0092* (2013.01); *E21B 43/126* (2013.01); *E21B 47/008* (2020.05); *E21B 47/06* (2013.01); *E21B 47/07* (2020.05); *E21B 49/08* (2013.01); *G06Q 10/06395* (2013.01); *G06Q 50/02* (2013.01)

(58) Field of Classification Search
None
See application file for complete search history.

(56) References Cited

U.S. PATENT DOCUMENTS

| | | | |
|---|---|---|---|
| 6,041,856 A * | 3/2000 | Thrasher | E21B 43/121 166/53 |
| 2005/0173114 A1* | 8/2005 | Cudmore | E21B 43/121 166/250.15 |

OTHER PUBLICATIONS

Proactive Rod Pump Optimization: Leveraging Big Data to Accelerate and Improve Operations, Tyler Palmer, 2016 (Year: 2016).*

* cited by examiner

*Primary Examiner* — Mohamed N El-Bathy
(74) *Attorney, Agent, or Firm* — Gowling WLG (Canada) LLP

(57) ABSTRACT

A customizable system and method for actively controlling and/or optimizing remote oil and/or gas production systems such as artificial-lifting systems runs within a desired or predefined envelope based on quantifiable and measurable parameters such as economical threshold, water cut, temperature, pressure, flow rate or vibration, failure model prediction, and the like. The execution of such optimizations or control is conducted with real-time diagnosis, thereby leading to the desired response or outcome.

17 Claims, 14 Drawing Sheets

W/W: Wired or Wireless connection
OPC: OLE Process Control
OLE: Object Linking & Embedding protocol
PI: PI System™
RPC: Rod Pump Controller
RTU: Remote Terminal Unit
DCS: Distributed Control System
PLC: Programmable Logic Controller
VSD: Variable Speed Drive
API: Application Programming Interface
SMTP: Simple Mail Transfer Protocol

SYSTEM AND METHOD FOR CONTROLLING OIL AND/OR GAS PRODUCTION

FIELD OF THE DISCLOSURE

The present disclosure relates generally to a system and method for controlling oil and/or gas production, and in particular to a customizable system and method for actively controlling and/or optimizing remote oil and/or gas production systems such as artificial-lifting systems.

BACKGROUND

The current oil/gas production systems such as oil-field artificial-lifting systems may be controlled remotely. However, the factors for determining and controlling the system actions are currently limited to basic pump parameters. Moreover, the current oil/gas production control systems do not have sufficient flexibility for adding and/or combining factors deemed critical and required by pump operators.

SUMMARY

Embodiments herein disclose a customizable system and method for actively controlling and/or optimizing remote oil and/or gas production systems such as artificial-lifting systems to run within a desired or predefined envelope based on quantifiable and measurable parameters. Depending on the user's or vendor's needs or economic definition, the desired parameters may be coded-in for addition, deletion, or modification as needed with virtually no limitations on how many customizable/modifiable variables or parameters employed in the system.

In some embodiments, the parameters may include surface and/or downhole temperatures such as tubing head temperature (THT) and/or ambient temperature, surface and/or downhole pressures such as tubing head pressure (THP), pump intake pressure, pump discharge pressure, one or more economical thresholds, vibration, water cuts, fluid levels, target flow rates or flow rate limitations, pump efficiency such as pump fillage, torque, frequency, speed measured in revolutions per minute (rpm) and/or in frequency, startup strategy such as how to start a field after a trip or initial commissioning, gas-to-oil ratio, well integrity, operational requirements and parameters, failure model prediction, and/or the like. In various embodiments, the one or more economical thresholds may include an oil price, a lifting cost, a processing cost such as water processing cost, an operation cost such as power consumption and cost, production duration, and/or the like.

Those skilled in the art will appreciate that the above list of parameters are examples only and one may choose other parameters for optimizing oil and/or gas production as needed. For example, in some embodiments, the parameters may also include gas rising, flow-line pressure, flow-line temperature, safety indicators, tracing table or tank indication, predictive maintenance indicators, production rate targets, reservoir depletion strategies, draw-down and downhole triggers, facility bottleneck, pipeline limitation, risk indicators such as spill indicators (e.g., tank level), sand indicators, scale indicators, asphaltene indicators, emulation indicators, density indicators, viscosity indicators, harness indicators, fluid property indicators, and/or the like.

The execution of such optimizations or control is conducted with real-time diagnosis thereby leading to the desired response or outcome.

The system and method disclosed herein conducts live analysis and diagnosis of one or more measurable parameters and selects one or more parameters for execution from a plurality of options such as increasing production rate, maintaining production rate, decreasing production rate, setting on specified timer to allow a production well to run or pause production at user-scheduled time and for user-specified duration, and for economic reasons shutting down production of a production-well field or shutting down production of one or more wells with parameters such as water cut, gas rising, and/or the like.

The customizable system and method may use a customizable logic or process to override the current logic that controls the wells (such as a Rod Pump Controller used by pump jack operators). The customizable process may be a simple process or a complex process depending on desired quantifiable permits with predefined set-points. The customizable process may be implemented as machine-executable code using any suitable and/or commonly-used programming language such as a programming language compatible with existing well-surveillance platforms. Such machine-executable code may be stored in one or more computer-readable storage devices or media.

According to one aspect of this disclosure, there is provided a computerized method for optimizing the operation of one or more oil or gas production wells, each well comprising a corresponding production device. The method comprises: for each well, (i) collecting data of the well in real-time from one or more sources including one or more of a data historian module, a database, said production devices, a well-status monitoring subsystem, and an input/output interface; (ii) determining an optimization target based on said data; (iii) analyzing and diagnosing said data in real-time; (iv) determining whether the production well is suitable for optimization based on the analyzing and diagnosing result; and (v) if the production well is suitable for optimization, optimizing the production well based on the analyzing and diagnosing result by increasing a production rate, decreasing a production rate, maintaining a current production rate, turning-off, or configuring a timer to run or pause the production well at a user-scheduled time and for a user-specified duration.

In some embodiments, said data comprises at least one of temperature downhole, temperature at surface, pressure downhole, pressure at surface, pump intake pressure downhole, pump intake pressure at surface, pump discharge pressure downhole, pump discharge pressure at surface, one or more economical thresholds, vibration, water cuts, fluid levels, target flow rates or flow rate limitations, pump efficiency, torque, frequency, speed, startup strategy, gas-to-oil ratio, well integrity, operational requirements and parameters, and failure model prediction.

In some embodiments, the one or more economical thresholds comprise at least one of an oil price, lifting cost, and processing cost such as water processing cost, operation cost, and production duration.

In some embodiments, the step (v) comprises, if the optimization target is to increase or decrease the current production rate to a target production rate, increasing or decreasing the current production rate by a predefined rate-incremental or rate-decremental, respectively, the rate-incremental or rate-decremental being smaller than what is required for adjusting the current production rate to the target production rate; and the method further comprises (vi) repeating steps (i) to (v) until the optimization target is reached.

In some embodiments, the method further comprises (vii) executing a reporting sub-process for reporting the optimization result.

In some embodiments, said determining whether the production well is suitable for optimization comprises determining whether the production well is suitable for optimization based on one or more conditions comprising at least one of historical pump efficiency data, variable frequency drive (VFD) motor status, historical THT data, the one or more economical thresholds, basic sediment and water, and THP.

In some embodiments, said on one or more conditions further comprises at least one of a communication status with the production well, running state of the production well, historical data validity, crank status, steam breakthrough status, well setting regarding whether or not the well is allowable for optimization, and rod pump controller (RPC) data.

In some embodiments, said optimizing the production well comprises optimizing the production well based on the historical pump efficiency data.

In some embodiments, said historical pump efficiency comprises historical pump fillage (PF) data.

In some embodiments, said determining whether the production well is suitable for optimization comprises the steps of (1) communicating with the production well for reading the RPC data and determining that the production well is not suitable for optimization if the production well is not in communication; (2) calculating a maximum and minimum speeds of a VFD of the production well using a static model and the RPC data; (3) checking the pump running state and a first average of THT over a first THT-averaging period of time, determining that the production well is not suitable for optimization and disabling the production well if the rod pump is not running in its normal state and the first average of THT is greater than a first temperature threshold, and determining that the production well is not suitable for optimization if the rod pump is not running in its normal state; (4) checking the validity of the historical data, said historical data comprising the first average of THT and a first average of PF over a first PF-averaging period of time, and determining that the production well is not suitable for optimization if less than a first threshold percentage of the historical data is valid; (5) checking the validity of the first average of PF and determining that the production well is not suitable for optimization if the first average of PF is not within 0 and 100%; (6) checking the status of a VFD motor of the production well and determining that the production well is not suitable for optimization if the VFD motor is not in operation; (7) checking the status of a production device of the production well and determining that the production well is not suitable for optimization if the production device of the production well is not properly functioning; (8) checking steam-breakthrough interlock, and if the steam-breakthrough interlock has been enabled for at least a predetermined or user-specified steam-breakthrough period of time, disabling the steam-breakthrough interlock and generating a report via the reporting sub-process; (9) checking if a second average of THT over a second THT-averaging period of time is greater than a second temperature threshold and executing a slowing-down-production sub-process if the second average of THT is greater than the second temperature threshold; (10) determining that the production well is not suitable for optimization if the first average of PF is less than a second threshold percentage and a second average of PF over a second PF-averaging period of time is greater than a third threshold percentage; (11) executing the slowing-down-production sub-process if the first average of PF is greater than or equal to the second threshold percentage; (12) checking a current oil-lifting speed and determining that the production well is not suitable for optimization if the current oil-lifting speed is greater than or equal to the calculated maximum speed; (13) checking the setting of the production well and determining that the production well is not suitable for optimization if production well is not allowed to increase the production rate; (14) checking the second average of THT and determining that the production well is not suitable for optimization if the second average of THT is less than a third temperature threshold; (15) checking the status of the steam-breakthrough interlock, determining that the production well is not suitable for optimization if the steam-breakthrough interlock is enabled; and (16) determining that the production well is suitable for optimization.

In some embodiments, said first THT-averaging period of time is a four-hour period of time.

In some embodiments, said second THT-averaging period of time is a 30-minute period of time.

In some embodiments, said steam-breakthrough period of time is a seven-day period of time.

In some embodiments, said first PF-averaging period of time is a four-hour period of time.

In some embodiments, said second PF-averaging period of time is a 30-minute period of time.

In some embodiments, said first temperature threshold is 280 degrees Celsius (° C.).

In some embodiments, said second temperature threshold is 150° C.

In some embodiments, said third temperature threshold is 40° C.

In some embodiments, said first threshold percentage is 70%.

In some embodiments, said second threshold percentage is 85%.

In some embodiments, said third threshold percentage is 75%.

In some embodiments, said optimizing the production well comprises the steps of (17) setting the maximum and minimum working speeds to a same speed if the maximum and minimum working speeds are different; (18) calculating a target oil-lifting speed for the variable speed drive (VSD) as the current oil-lifting speed increased by a first speed incremental value if the PF is greater than or equal to a fourth threshold percentage, or as the current oil-lifting speed increased by a second speed incremental value smaller than the first speed incremental value if the PF is not greater than the fourth threshold percentage; (19) terminating the optimization of the production well if the target oil-lifting speed is greater than the maximum speed; (20) calculating a working frequency of the VFD based on the target oil-lifting speed; (21) setting the speed of the VSD as the calculated working frequency for increasing the production rate; (22) communicating with the production well and checking if there is any detected rounding issue; and (23) if a rounding issue is detected, calculating a frequency value from the speed of the VSD, and if the frequency value is greater than a maximum frequency value, reducing the frequency value by a frequency decremental value and proceeding to step (21).

In some embodiments, said fourth threshold percentage is 98%.

In some embodiments, said first speed incremental value is one stroke per minute.

In some embodiments, said second speed incremental value is 0.5 stroke per minute.

In some embodiments, said frequency decremental value is one Hz.

In some embodiments, said slowing-down-production sub-process comprises the steps of (24) checking the setting of the production well and determining that the production well is not suitable for optimization if production well is not allowed to decrease the production rate; (25) checking the second average of PF and if the second average of PF is less than a fifth threshold percentage, generating a report via the reporting sub-process; (26) if the RPC maximum and minimum working speeds are not same, setting the RPC maximum and minimum working speeds to a same speed; (27) checking if the second average of THT is greater than the second temperature threshold; (28) calculating a target oil-lifting speed for the VSD as the current oil-lifting speed decreased by a first speed decremental value and generating a report via the reporting sub-process if the second average of THT is smaller than or equal to the second temperature threshold; (29) calculating the target oil-lifting speed for the VSD as the current oil-lifting speed decreased by a second speed decremental value (such as one stroke per minute) that is greater than the first speed decremental value, if the second average of THT is greater than the second temperature threshold and the production well is a slow-category steam breakthrough well; (30) calculating the target oil-lifting speed for the VSD as the current oil-lifting speed decreased by the second speed decremental value, and generating a report via the reporting sub-process, if the second average of THT is greater than the second temperature threshold, the production well is not a slow-category steam breakthrough well, and the steam-breakthrough interlock is enabled; (31) triggering the steam-breakthrough interlock, tracking the detection date of steam breakthrough, calculating the target oil-lifting speed for the VSD as the current oil-lifting speed decreased by the second speed decremental value, and generating a report via the reporting sub-process, if the second average of THT is greater than the second temperature threshold, the production well is not a slow-category steam breakthrough well, and the steam-breakthrough interlock is disabled; (32) terminating the optimization of the production well if the target oil-lifting speed is smaller than the minimum speed; (33) calculating the working frequency of the VFD based on the target oil-lifting speed; (34) setting the speed of the VSD as the calculated working frequency for decreasing the production rate; (35) communicating with the production well and checking if there is any detected rounding issue; and (36) calculating a frequency value from the speed of the VSD, and if the frequency value is less than a minimum frequency value, increasing the frequency value by a frequency incremental value and proceeding to step (34).

In some embodiments, said fourth threshold percentage is 50%.

In some embodiments, said first speed decremental value is 0.5 stroke per minute.

In some embodiments, said second speed decremental value is one stroke per minute.

In some embodiments, said frequency incremental value is one Hz.

In some embodiments, said reporting sub-process comprises the steps of generating a Hypertext Markup Language (HTML) report; sending the generated HTML report to one or more users via emails; saving a backup of the report at one or more backup servers; and a backing-up configuration file and disabled wells in steam phase or with wrong pump fillage values.

In some embodiments, said reporting sub-process further comprises the steps of write optimization feedback; and saving optimization logs to a log file.

According to one aspect of this disclosure, there is provided a system for optimizing one or more oil or gas production wells, each well comprising a corresponding production device. The system comprises: a memory; a networking interface configured for communicating with each production device; and at least one processing structure functionally coupled to the memory and the networking interface. The at least one processing structure is configured for: for each well, (i) collecting data of the well in real-time from one or more sources including one or more of a data historian module, a database, said production devices, a well-status monitoring subsystem, and an input/output interface; (ii) determining an optimization target based on said data; (iii) analyzing and diagnosing said data in real-time; (iv) determining whether the production well is suitable for optimization based on the analyzing and diagnosing result; and (v) if the production well is suitable for optimization, optimizing the production well based on the analyzing and diagnosing result by increasing a production rate, decreasing a production rate, maintaining a current production rate, turning-off, or configuring a timer to run or pause the production well at a user-scheduled time and for a user-specified duration.

According to one aspect of this disclosure, there is provided a non-transitory computer-readable storage device storing computer-executable code for optimizing one or more oil or gas production wells, each well comprising a corresponding production device. The computer-executable code, when executed, causes at least one processing structure to perform actions comprising: for each well, (i) collecting data of the well in real-time from one or more sources including one or more of a data historian module, a database, said production devices, a well-status monitoring subsystem, and an input/output interface; (ii) determining an optimization target based on said data; (iii) analyzing and diagnosing said data in real-time; (iv) determining whether the production well is suitable for optimization based on the analyzing and diagnosing result; and (v) if the production well is suitable for optimization, optimizing the production well based on the analyzing and diagnosing result by increasing a production rate, decreasing a production rate, maintaining a current production rate, turning-off, or configuring a timer to run or pause the production well at a user-scheduled time and for a user-specified duration.

DETAILED DESCRIPTION

Figure 1:
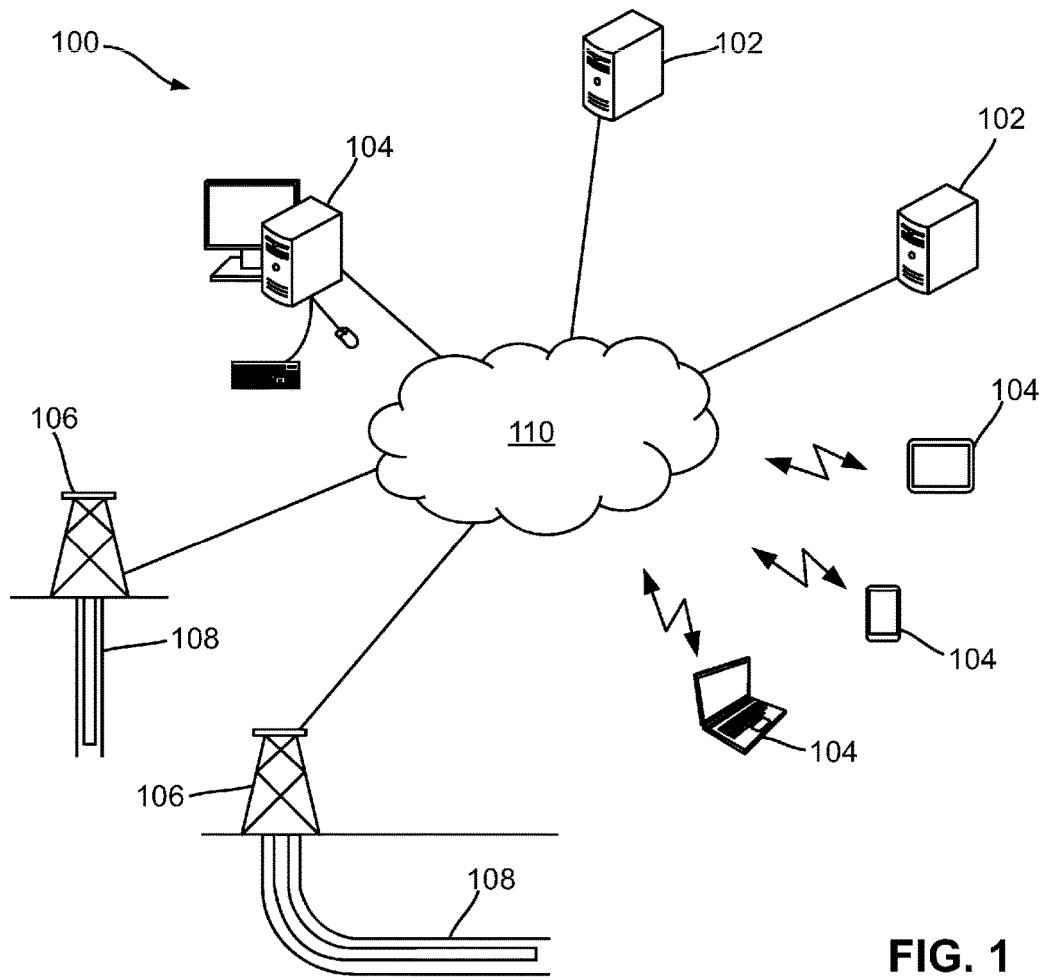
FIG. 1 is a schematic diagram of an oil-production controlling system, according to some embodiments of this disclosure.

Turning now to FIG. 1, an example of an oil-production controlling system according to the present disclosure is shown and is generally identified using reference numeral 100. As shown, the oil-production controlling system 100 comprises one or more server computers 102, one or more client-computing devices 104, and one or more oil-production devices 106 operating on oil wells 108 such as pump-jacks, rigs, and the like. The oil wells 108 may be vertical wells having substantially vertical wellbores, and/or horizontal wells having substantially horizontal wellbore sections.

The one or more server computers 102, one or more client-computing devices 104, and one or more oil-production devices 106 are functionally interconnected by a network 110, such as the Internet, a local area network (LAN), a wide area network (WAN), a metropolitan area network (MAN), and/or the like via suitable wired and wireless networking connections.

Each server computer 102 executes one or more server programs. Depending on implementation, the server computer 102 may be a server computing device, and/or a general purpose computing device acting as a server computer while also being used by a user.

Each client-computing device 104 executes one or more client application programs and for users to use. The client-computing devices 104 may be desktop computers, laptop computers, tablets, smartphones, Personal Digital Assistants (PDAs), and the like.

Figure 2:
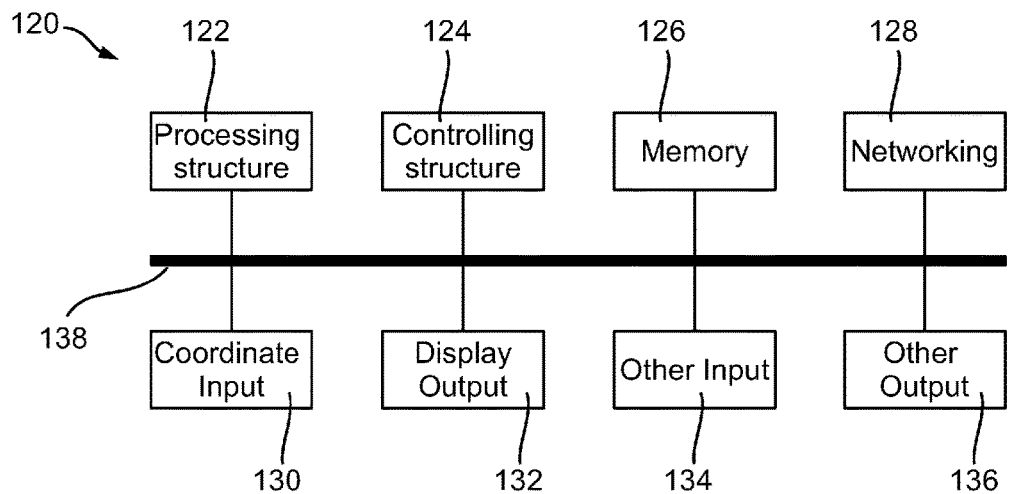
FIG. 2 is a schematic diagram illustrating a hardware structure of a computing device of the oil-production controlling system shown in FIG. 1.

Generally, the computing devices 102 and 104 have a similar hardware structure such as a hardware structure 120 shown in FIG. 2. As shown, the computing device 102/104 comprises a processing structure 122, a controlling structure 124, memory or storage 126, a networking interface 128, coordinate input 130, display output 132, and other input and output modules 134 and 136, all functionally interconnected by a system bus 138.

The processing structure 122 may be one or more single-core or multiple-core computing processors such as INTEL® microprocessors (INTEL is a registered trademark of Intel Corp., Santa Clara, Calif., USA), AMD® microprocessors (AMD is a registered trademark of Advanced Micro Devices Inc., Sunnyvale, Calif., USA), ARM® microprocessors (ARM is a registered trademark of Arm Ltd., Cambridge, UK) manufactured by a variety of manufactures such as Qualcomm of San Diego, Calif., USA, under the ARM® architecture, or the like.

The controlling structure 124 comprises a plurality of controllers such as graphic controllers, input/output chipsets, and the like, for coordinating operations of various hardware components and modules of the computing device 102/104.

The memory 126 comprises a plurality of memory units accessible by the processing structure 122 and the controlling structure 124 for reading and/or storing data, including input data and data generated by the processing structure 122 and the controlling structure 124. The memory 126 may be volatile and/or non-volatile, non-removable or removable memory such as RAM, ROM, EEPROM, solid-state memory, hard disks, CD, DVD, flash memory, or the like. In use, the memory 126 is generally divided to a plurality of portions for different use purposes. For example, a portion of the memory 126 (denoted as storage memory herein) may be used for long-term data storing, for example, storing files or databases. Another portion of the memory 126 may be used as the system memory for storing data during processing (denoted as working memory herein).

The networking interface 128 comprises one or more networking modules for connecting to other computing devices or networks through the network 110 by using suitable wired or wireless communication technologies such as Ethernet, WIFI®, (WI-FI is a registered trademark of Wi-Fi Alliance CORPORATION CALIFORNIA, Austin, TEXAS, USA), BLUETOOTH® (BLUETOOTH is a registered trademark of Bluetooth Sig Inc., Kirkland, Wash., USA), ZIGBEE® (ZIGBEE is a registered trademark of ZigBee Alliance Corp., San Ramon, Calif., USA), 3G and 4G wireless mobile telecommunications technologies, and/or the like. In some embodiments, parallel ports, serial ports, USB connections, optical connections, or the like may also be used for connecting other computing devices or networks although they are usually considered as input/output interfaces for connecting input/output devices.

The display output 132 comprises one or more display modules for displaying images, such as monitors, LCD displays, LED displays, projectors, and the like. The display output 132 may be a physically integrated part of the computing device 102/104 (for example, the display of a laptop computer or tablet), or may be a display device physically separated from but functionally coupled to other components of the computing device 102/104 (for example, the monitor of a desktop computer).

The coordinate input 130 comprises one or more input modules for one or more users to input coordinate data, such as touch-sensitive screen, touch-sensitive whiteboard, trackball, computer mouse, touch-pad, and/or other human interface devices (HIDs). The coordinate input 130 may be a physically integrated part of the computing device 102/104 (for example, the touch-pad of a laptop computer or the touch-sensitive screen of a tablet), or may be a display device physically separated from but functionally coupled to other components of the computing device 102/104 (for example, a computer mouse). The coordinate input 130 in some implementations may be integrated with the display output 132 to form a touch-sensitive screen or touch-sensitive whiteboard.

The computing device 102/104 may also comprise other input 134 such as keyboards, microphones, scanners, cameras, and/or the like. The computing device 102/104 may further comprise other output 136 such as speakers, printers, and/or the like. In some embodiments, at least one client-computing device 104 may also comprise a positioning component such as a Global Positioning System (GPS) component for determining the position thereof. In some alternative embodiments, at least one client-computing device 104 is functionally coupled to an external GPS device for determining the position of the client-computing device 104.

The system bus 138 interconnects various components 122 to 136 enabling them to transmit and receive data and control signals to/from each other.

Figure 3:
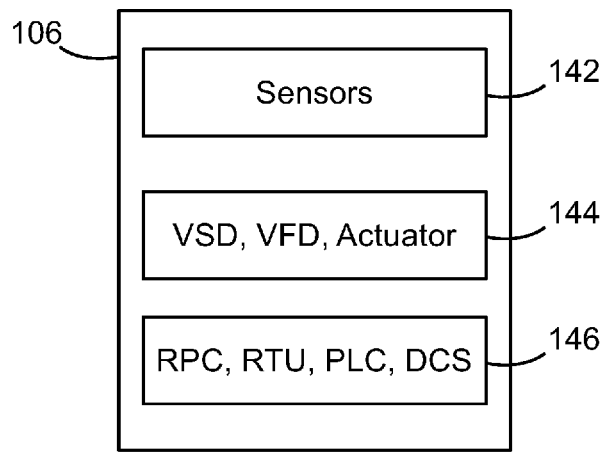
FIG. 3 is a schematic diagram illustrating hardware components for monitoring and controlling the oil-production devices shown in FIG. 1.

FIG. 3 shows the hardware components for monitoring and controlling the oil-production devices 106. The hardware components may comprises various sensors 142 for monitoring the operation conditions of each oil-production device 106, drives 144 for operating the oil-production device 106, and controllers 146. Examples of drives 144 may be variable speed drives (VSDs), variable frequency drives (VFDs), actuators, and the like. Examples of controllers 146 may be rod pump controllers (RPCs), remote terminal units (RTUs), distributed control systems (DCS), programmable logic controllers (PLCs), and the like. Although not shown in FIG. 3, those skilled in the art will appreciate that other hardware components may also be used for monitoring and controlling the oil-production devices 106.

Figure 4:
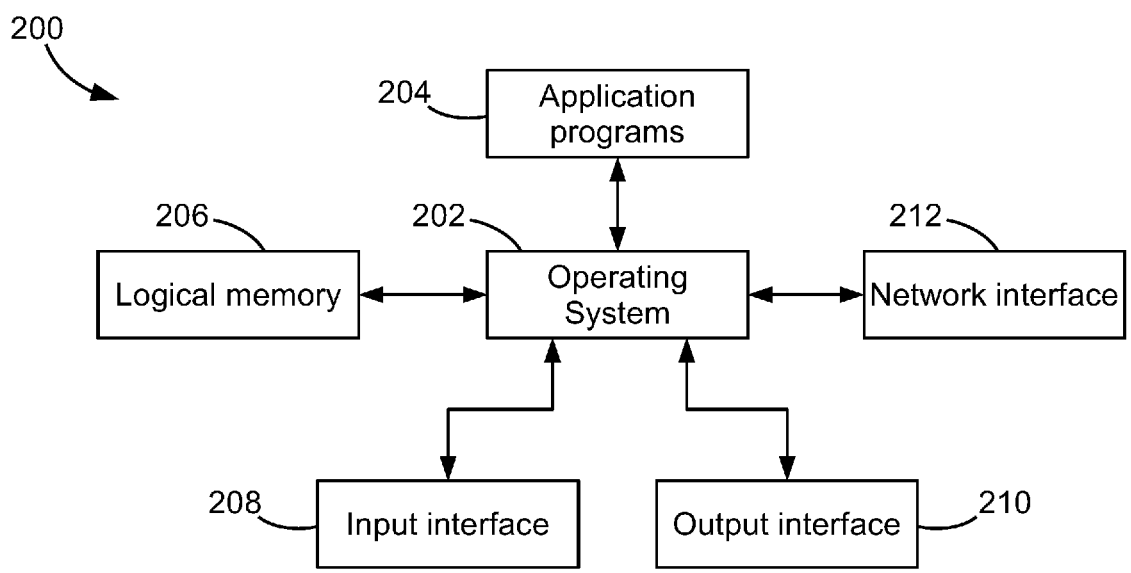
FIG. 4 is a schematic diagram illustrating a simplified software architecture of a computing device of the oil-production controlling system shown in FIG. 1.

FIG. 4 shows a simplified software architecture 200 of a computing device 102/104. The software architecture 200 comprises an operating system 202, one or more application programs 204, logic memory 206, an input interface 208, an output interface 210, and a network interface 212.

The operating system 202 manages various hardware components of the computing device 102/104 via the input interface 208 and the output interface 210, manages logic memory 206, manages network communications via the network interface 212, and manages and supports the application programs 204 which are executed or run by the processing structure 122 for performing various jobs.

As those skilled in the art appreciate, the operating system 202 may be any suitable operating system such as MICROSOFT® WINDOWS® (MICROSOFT and WINDOWS are registered trademarks of the Microsoft Corp., Redmond, Wash., USA), APPLE® OS X, APPLE® iOS (APPLE is a registered trademark of Apple Inc., Cupertino, Calif., USA), Linux, ANDROID® (ANDROID is a registered trademark of Google Inc., Mountain View, Calif., USA), or the like. The computing devices 102/104 in the system 100 may all have the same operating system, or may have different operating systems.

The input interface 208 comprises one or more input-device drivers managed by the operating system 202 for communicating with respective input devices including the coordinate input 130 and other input 134. The output interface 210 comprises one or more output-device drivers managed by the operating system 202 for communicating with respective output devices including the display output 132 and other output 136. Input data received from the input devices via the input interface 208 may be sent to one or more application programs 204 for processing. The output generated by the application programs 204 may be sent to respective output devices via the output interface 210.

The logical memory 206 is a logical mapping of the physical memory 126 for facilitating the application programs 204 to access. In this embodiment, the logical memory 206 comprises a storage memory area that is usually mapped to non-volatile physical memory, such as hard disks, solid state disks, flash drives, and/or the like, for generally long-term storing data therein. The logical memory 206 also comprises a working memory area that is generally mapped to high-speed, and in some implementations volatile, physical memory such as RAM, for the operating system 202 and/or application programs 204 to generally temporarily store data during program execution. For example, an application program 204 may load data from the storage memory area into the working memory area, and may store data generated during its execution into the working memory area. The application program 204 may also store some data into the storage memory area as required or in response to a user's command.

A server computer 102 or a client-computing device when acting as a server 102 generally comprises one or more server application programs 204, which provide server-side functions for managing the system 100.

A client-computing device 104 generally comprises one or more client application programs 204, which provide client-side functions for communicating with the server application programs 204, displaying information and data on the graphic user interface (GUI) thereof, receiving user's instructions, and collaborating with the server application programs 204 for managing the system 100.

Figure 5A:
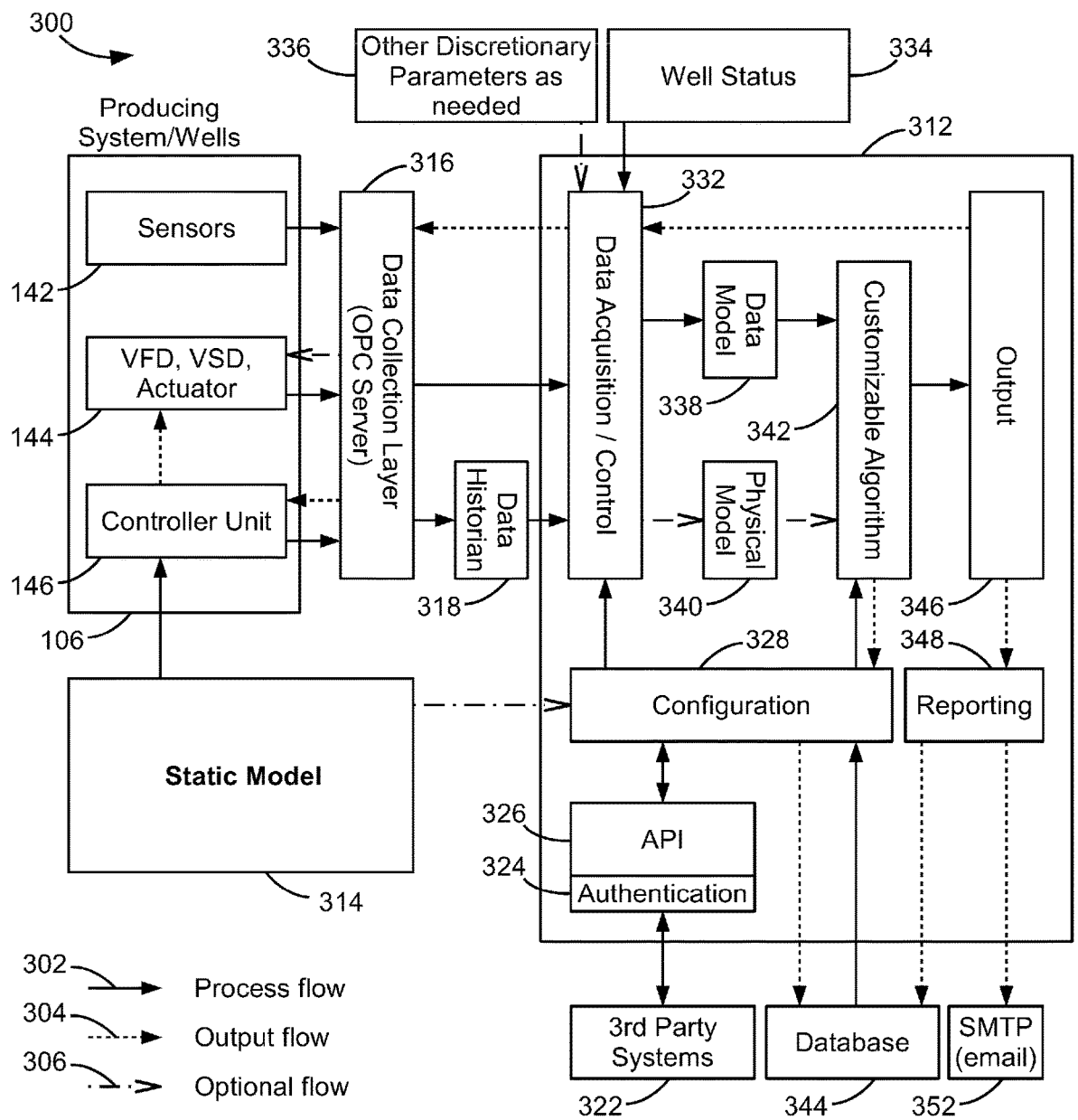
FIG. 5A is a block diagram illustrating a functional structure of the oil-production controlling system shown in FIG. 1.

FIG. 5A is a block diagram showing a functional structure 300 of the system 100. The functional structure 300 may be implemented by one or more server application programs and/or one or more client application programs. The functional structure 300 comprises a process flow 302 (indicated using solid lines with triangular arrows) and an output flow 304 (indicated using dash lines with triangular arrows) for exchanging data and instructions among a plurality of function modules. The functional structure 300 may comprise an optional flow 306 (indicated using dash-dot lines with line-arrows) that may not be implemented in some embodiments.

In the functional structure 300, the system 100 comprises a management module 312 for monitoring status of the oil-production devices 106, wells, and other necessary parameters, and for controlling the operation of the oil-production devices. In particular, the oil-production devices 106 obtains data from the sensors 142, drives 144, and controllers 146 based on respective static models 314 such as a pressure, temperature, and volume (PVT) model of fluid, a downhole completion model, a surface condition model, rod tapers, and/or the like.

A data collection layer 316 collects data obtained by the oil-production devices 106 and sends the collected data to a data historian module 318. In these embodiments, the data collection layer 316 is an Object Linking & Embedding protocol (OLE) Process Control (OPC) server.

The data historian module 318 manages a historian database storing historical data that may be used for production management. The data collected by the data collection layer 316 and the historical data of the data historian module 318 are used by the management module 312 for production optimization.

By using historical data, the system 100 maintains full knowledge of the status and operation of production wells, and may use the current/real-time and historical data to calculate well production data such as the average, maximum, minimum, and/or the like.

The management module 312 optimizes the production rate in response to user instructions and user-designated parameters received directly from one or more users or via one or more third-party systems 322. In particular, a user (not shown) may go through an authentication process managed by an authentication submodule 324 to gain access to the management module 312. Then, the user may use an application programming interface (API) 326 to initiate user instructions.

A configuration submodule 328 processes the user instructions to determine the actions required for responding to the user instructions. For example, the configuration submodule 328 may instruct a data acquisition/control submodule 332 to collect data from a variety of sources such as the oil-production devices 106 via the data collection layer 316, the data historian module 318, well-status monitoring subsystem 334, third-party system 322 (via the API 326), database 344, and optionally other discretionary parameters 336 as needed. The API 326 acts as an input/output interface for communicating with the third-party system 322. The third-party system 322 and database 344 handle configurations based on data requirement through sensors, tables or quantifiable measurable database.

The data acquisition/control submodule 332 combines the collected data and applies the combined data to a data model of a data-model submodule 338. Optionally, the data acquisition/control submodule 332 may also apply the combined data to a physical model of a physical-model submodule 340. The output of the data-model submodule 338 and optionally the output of the physical-model module 340 are processed using a customizable algorithm submodule 342 to optimize the oil production rate. The configuration submodule 328 may also retrieve parameters and previous production optimization records from one or more databases 344 and sends the retrieved production optimization records to the customizable algorithm submodule 342 for oil production optimization. The optimization results are stored into the database 344 under the control of the configuration submodule 328, and are also sent to an output submodule 346.

Based on the optimization results, the output submodule 346 sends instructions via the data acquisition/control submodule 332 to the controllers 146 and optionally the drives 144 to adjust the operation of the oil-production devices 106 for optimized production under user instructions. The output submodule 346 may also send the optimization results and actions of the controllers 146 and drives 144 to a reporting submodule 348 for reporting to the user by, for example, displaying the optimization results and actions on a display device, sending one or more reporting emails to the user via a Simple Mail Transfer Protocol (SMTP) server 352, sending a text message to the user, and/or the like.

Figure 5B:
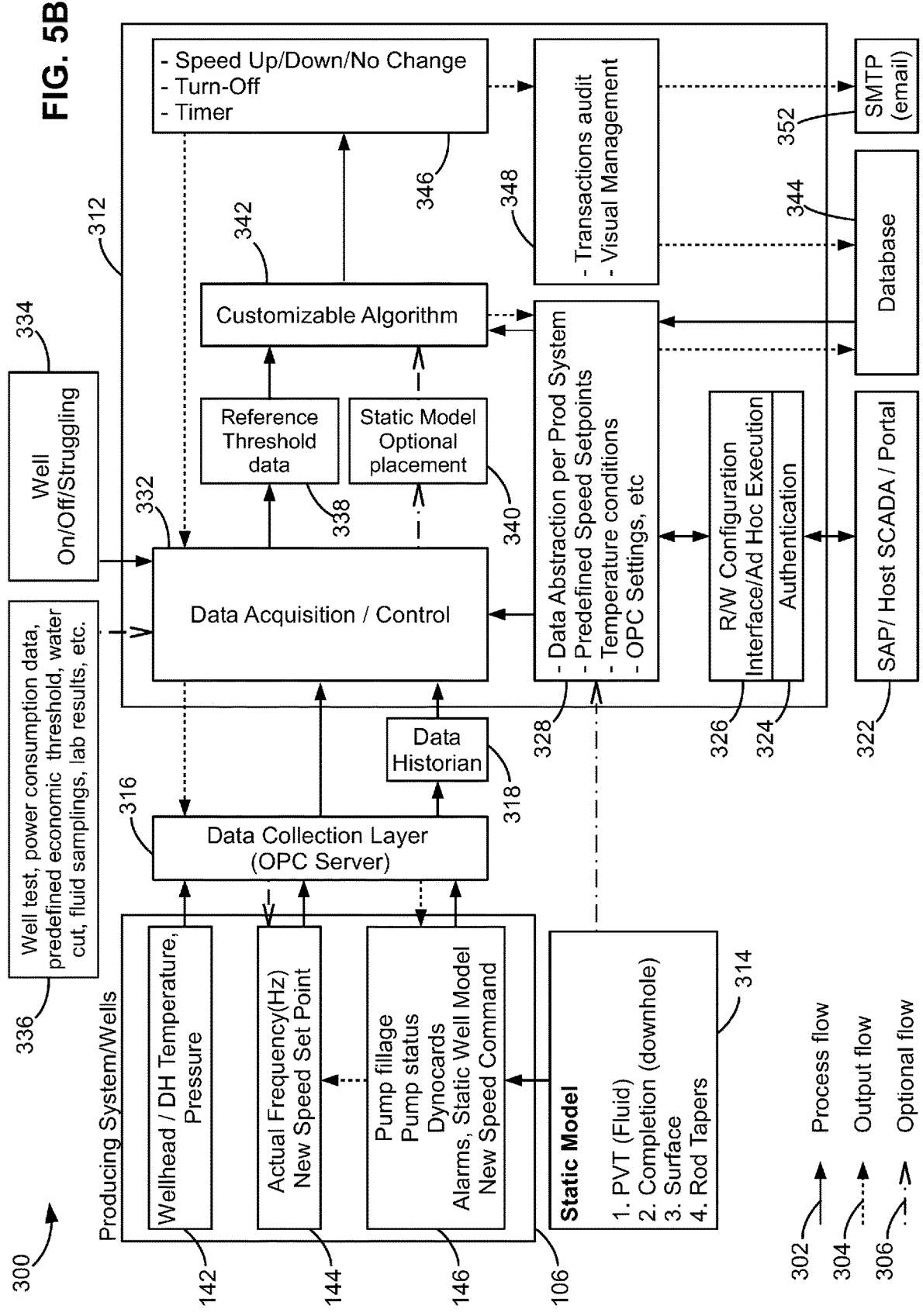
FIG. 5B shows an example of the functional structure shown in FIG. 5A.

FIG. 5B shows an example of the functional structure 300 of the system 100. In this example, the sensors 142 obtains wellhead data and downhole data such as temperatures, pressures, and the like. The drives 144 are adjustable to desired speed set-points by, for example, adjusting the frequency of the VFD. The controllers 146 may be used to monitor and control various parameters of the oil-production devices 106 such as the pump fillage (i.e., the quantity of fluid entering the pump on each stroke), pump status, dynocards, alarms, static well model, speed, and the like. As described above, the data of the oil-production devices 106 are collected by the data collection layer 216, and are stored in the data historian module 318 which in this example is a PI SYSTEM® (PI SYSTEM is a trademark of OSIsoft, LLC of San Leandro, Calif., USA).

In this example, a user may use a third-party system such as SAP, a Supervisory Control and Data Acquisition (SCADA) host platform, or other suitable platform to authenticate and gain access to the management module 312. The API 326 provides functions such as read and write configuration, interface, ad-hoc execution, and the like.

The configuration submodule 328 processes the user instructions and obtains data abstraction of each production device 106, predefined speed set-points, temperature conditions, OPC settings, and the like. As described above, the configuration submodule 328 instructs the data acquisition/control submodule 332 to collect data from a variety of sources including the production devices 106 via the data collection layer 316, the PI system 318, well-status monitoring subsystem 334 collecting well status data such as well on, well off, or well struggling, and optionally other discretionary parameters 336 such as well test, power consumption data, predefined economic threshold, water cut, fluid samplings, lab results, and the like.

Data collected by the data acquisition/control submodule 332 is sent to the data-model submodule 338 with reference threshold data. For example, a user or vendor may determine important factors and define the operating envelopes thereof with thresholds of relevant parameters as needed. Data collected by the data acquisition/control submodule 332 may optionally also be sent to the physical-model submodule 340 with a static model established based on well operating unit. The static model provide a theoretical limitation for operating envelope.

The outputs of the data-model submodule 338 and the physical-model submodule 340 are processed by the customizable algorithm submodule 342 for production optimization. The optimization results are sent to the output submodule 346. As described above, the output submodule 346 determines actions to be taken such as increasing the oil-lifting speed (for example, increasing the pump-jack speed) for increasing production rate, decreasing the oil-lifting speed (for example, decreasing the pump-jack speed) for decreasing production rate, maintaining the current oil-lifting speed for maintaining the current production rate, turning-off the oil lifting device such as the pump-jack, timer adjustments, and/or the like, and instructs the oil-production devices 106 such as the controllers 146 and drives 144 thereof to perform the determined actions. The output submodule 346 also sends the optimization results and actions of the controllers 146 and drives 144 to the reporting submodule 348 which provides transactions audit, visual management, email notification via the SMPT server 352, and/or the like.

Figure 6:
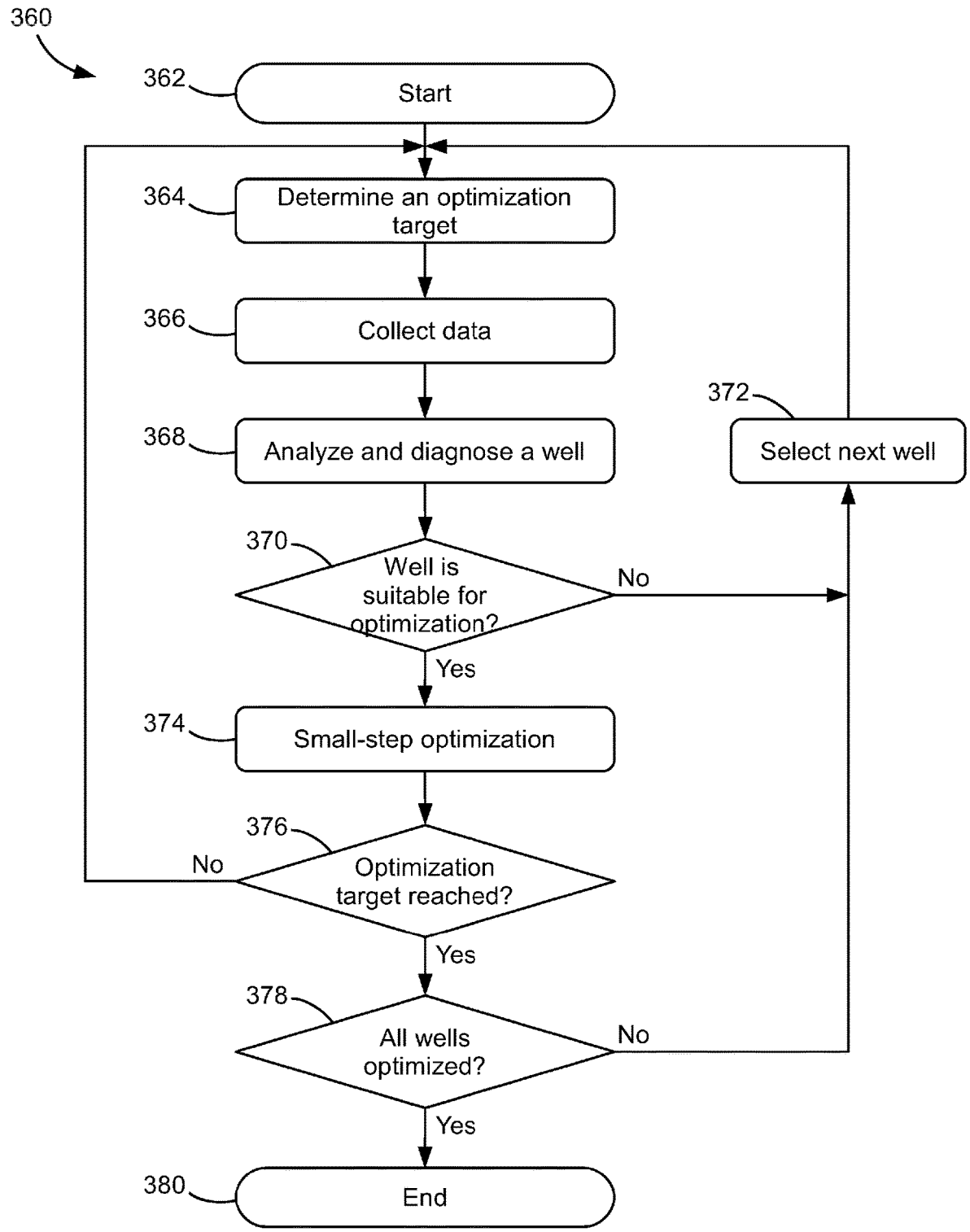
FIG. 6 is a flowchart illustrating a process executed by the oil-production controlling system shown in FIG. 1 for optimizing oil production, according to some embodiments of this disclosure.

FIG. 6 is a flowchart illustrating a process 360 in some embodiments for optimizing oil production in accordance with the customizable algorithm 342. In these embodiments, the system 100 uses the process 360 to manage a plurality of production devices 106 suitable for oil production wherein each oil-production device 106 produces oil from a corresponding well (denoted as enabled wells).

As shown, when the process 360 starts, the customizable algorithm submodule 342 reads a configuration file from the configuration submodule 328 and processes a first enabled well (step 362). The customizable algorithm submodule 342 collects data of the well in real time including the well parameters, well operation parameters, conditions, requirements, and/or the like (step 364), and determines an optimization target such as a target production rate (step 366).

In some embodiments, the parameters may include temperature downhole and/or at surface such as the tubing head temperature (THT) and/or ambient temperature, pressure downhole and/or at surface such as the tubing head pressure (THP), pump intake pressure downhole and/or at surface, pump discharge pressure downhole and/or at surface, one or more economical thresholds, vibration, water cuts, fluid levels, target flow rates or flow rate limitations, pump efficiency such as pump fillage, torque, frequency, speed measured in revolutions per minute (rpm) and/or in frequency, startup strategy such as how to start a field after a trip or initial commissioning, gas-to-oil ratio, well integrity, operational requirements and parameters, failure model prediction, and/or the like. In various embodiments, the one or more economical thresholds may include an oil price, lifting cost, processing cost such as water processing cost, operation cost such as power consumption and cost, production duration, and/or the like.

Those skilled in the art will appreciate that the above list of parameters are examples only, and one may choose other parameters for optimizing oil and/or gas production as needed. For example, in some embodiments, the parameters may also include gas rising, flow line pressure, flow line temperature, safety indicator, trucing table or tank indication, predictive maintenance indicator, production rate target, reservoir depletion strategy, draw-down and downhole triggers, facility bottleneck, pipeline limitation, risk indicators such as spill indicator (e.g., tank level), sand indicator, scale indicator, asphaltene indicator, emulation indicator, density indicator, viscosity indicator, harness indicator, fluid properties, and/or the like.

At step 368, the customizable algorithm submodule 342 analyzes and diagnoses the well for determining whether the well is suitable for optimization based on one or more conditions comprising historical pump efficiency data (such as pump fillage), VFD motor status, historical THT data, one or more economical thresholds, basic sediment and water, power consumption, THP, and/or the like (step 370). In some embodiments, the one or more conditions may also comprise at least one of a communication status with the production well, running state of the production well, historical data validity, crank status, steam breakthrough status, well setting regarding whether or not the well is allowable for optimization, and rod pump controller (RPC) data.

For example, a well may not be suitable for optimization to increase its production rate if the well is already at its maximum production rate. As another example, a well is not suitable for optimization if the well has been excluded from optimization by an operator or an administrator.

At step 370, if the well is not suitable for optimization, the process 360 branches to step 372 to select a next well and then loops back to step 364 for optimization. If it is determined that the well is suitable for optimization, the customizable algorithm submodule 342 then conducts a small-step optimization to the well based on the analyzing and diagnosing result (step 374). For example, if the optimization target is to increase the production rate to the target production rate, the customizable algorithm submodule 342 commands the well to adjust its production parameters to increase its production rate by a predetermined rate-increment that is generally smaller than what is required for adjusting the current production rate to the target production rate (i.e., the difference between the target production rate and the current production rate). If the optimization target is to decrease the production rate to the target production rate, the customizable algorithm submodule 342 commands the well to adjust its production parameters to decrease its production rate by a predetermined rate-decrement that is generally smaller than what is required for adjusting the current production rate to the target production rate (i.e., the difference between the current production rate and the target production rate). Of course, no production rate adjustment would be conducted if the current production rate is substantively equal to the target production rate.

After the small-step optimization, the customizable algorithm submodule 342 checks if the optimization target has been reached (step 376). If not, the process 360 loops back to step 364 for further optimization. If the optimization target has been reached, the customizable algorithm submodule 342 checks if all wells have been optimized (step 378). If not, the process 360 branches to step 372 to select a next well and then loops back to step 364 for optimization. If all wells have been optimized, the process 360 then ends (step 380).

With above process 360, the well optimization is conducted generally through a plurality of loops from steps 364 to step 376. In each loop, the customizable algorithm submodule 342 conducts a small-step optimization with a small incremental or decremental production-rate adjustment. In this manner, the customizable algorithm submodule 342 ensures a smooth optimization process to quickly reach the optimization target. On the other hand, due to the complicated relationship between the well operation parameters and the production rate, the conventional optimization methods that try to directly set the current production rate to the target production rate may cause "over-adjustment" of the well operation parameters which may result in a production rate far from the target production rate and need further adjustments. Consequently, the conventional optimization methods may require a longer time and a more abrupt process to reach the optimization target, compared to the optimization method disclosed herein.

Figure 7A:
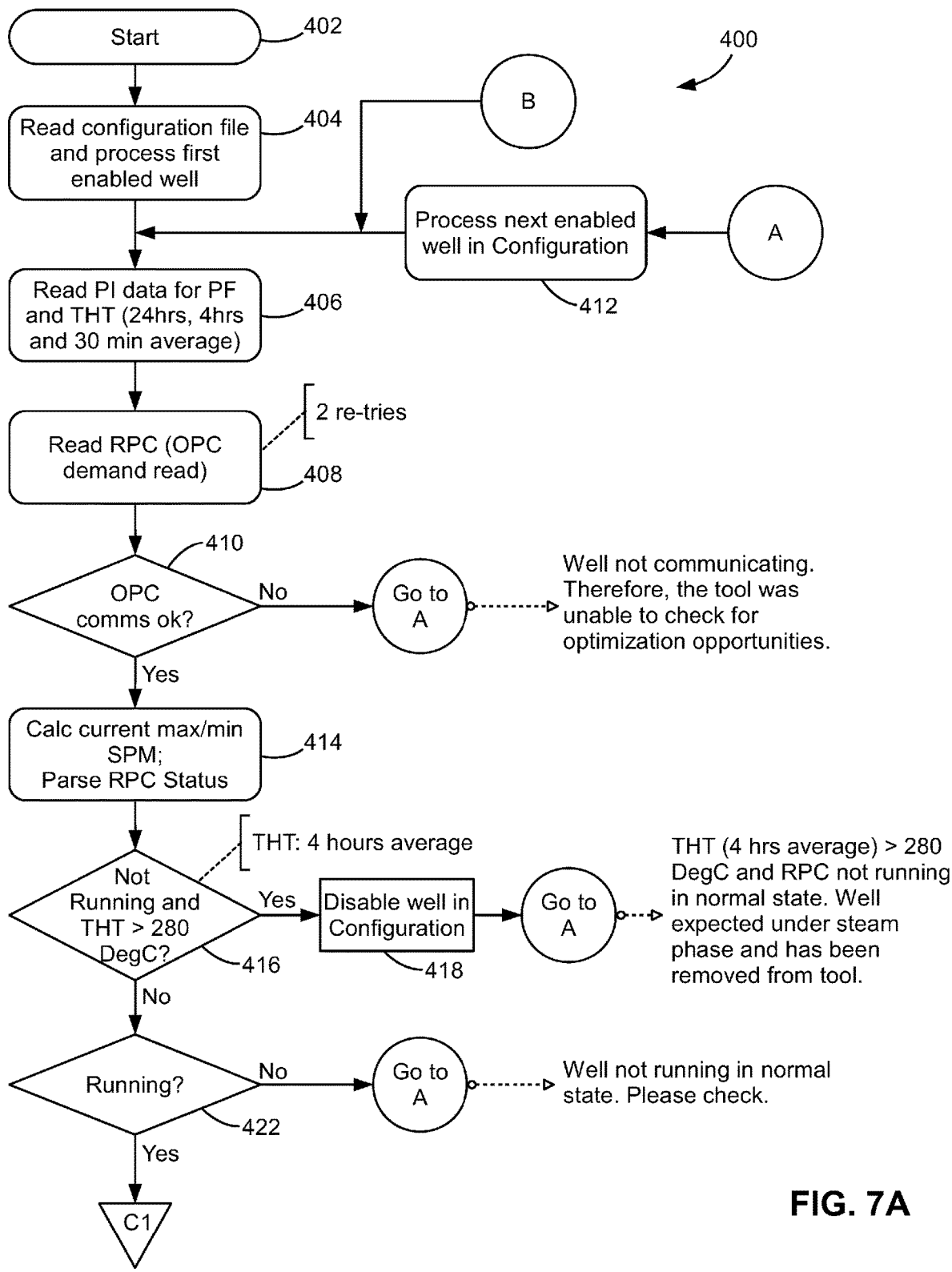
FIGS. 7A to 7I show a flowchart illustrating a process executed by the oil-production controlling system shown in FIG. 1 for optimizing oil production.
Figure 7B:
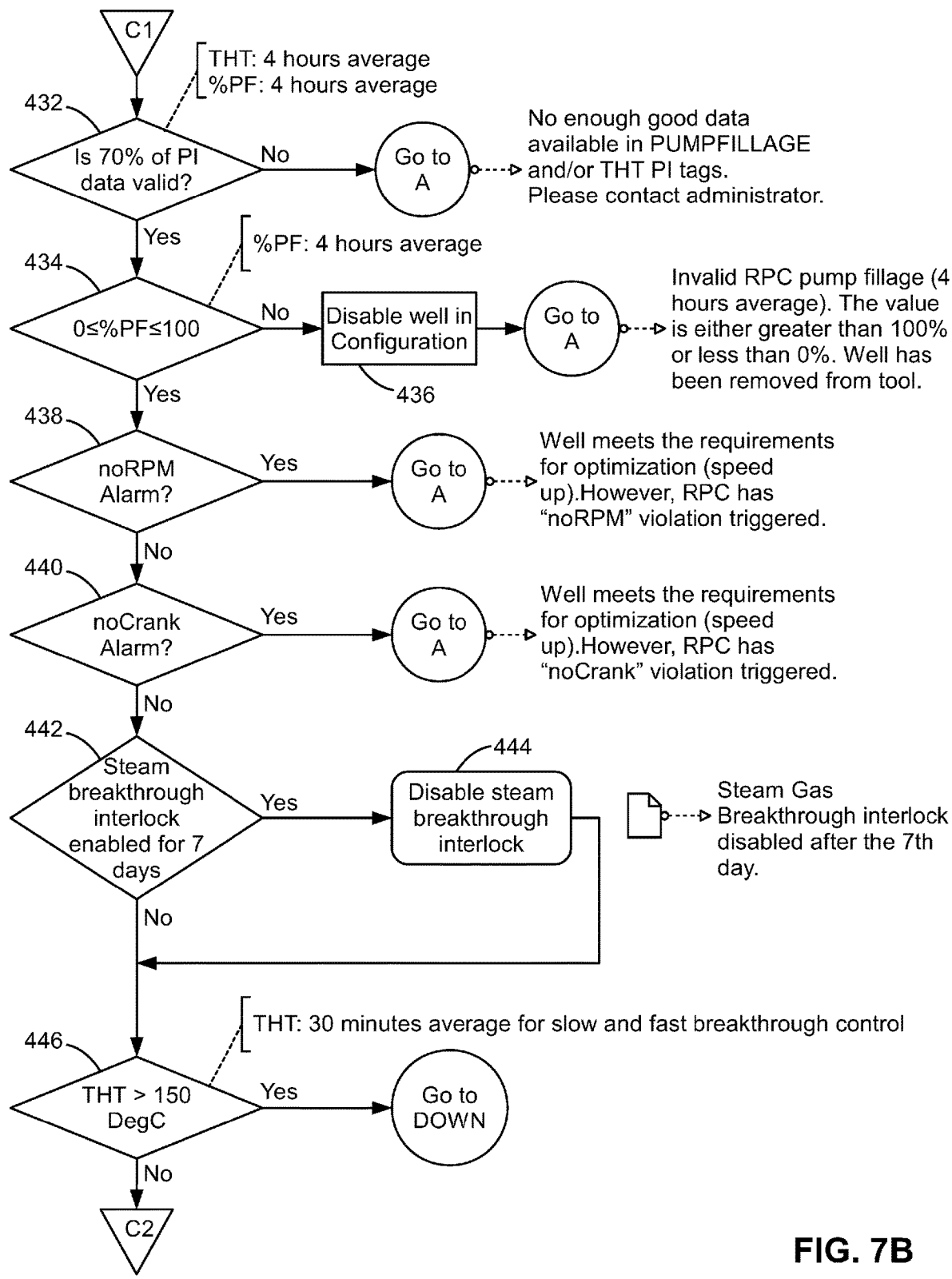
Figure 7C:
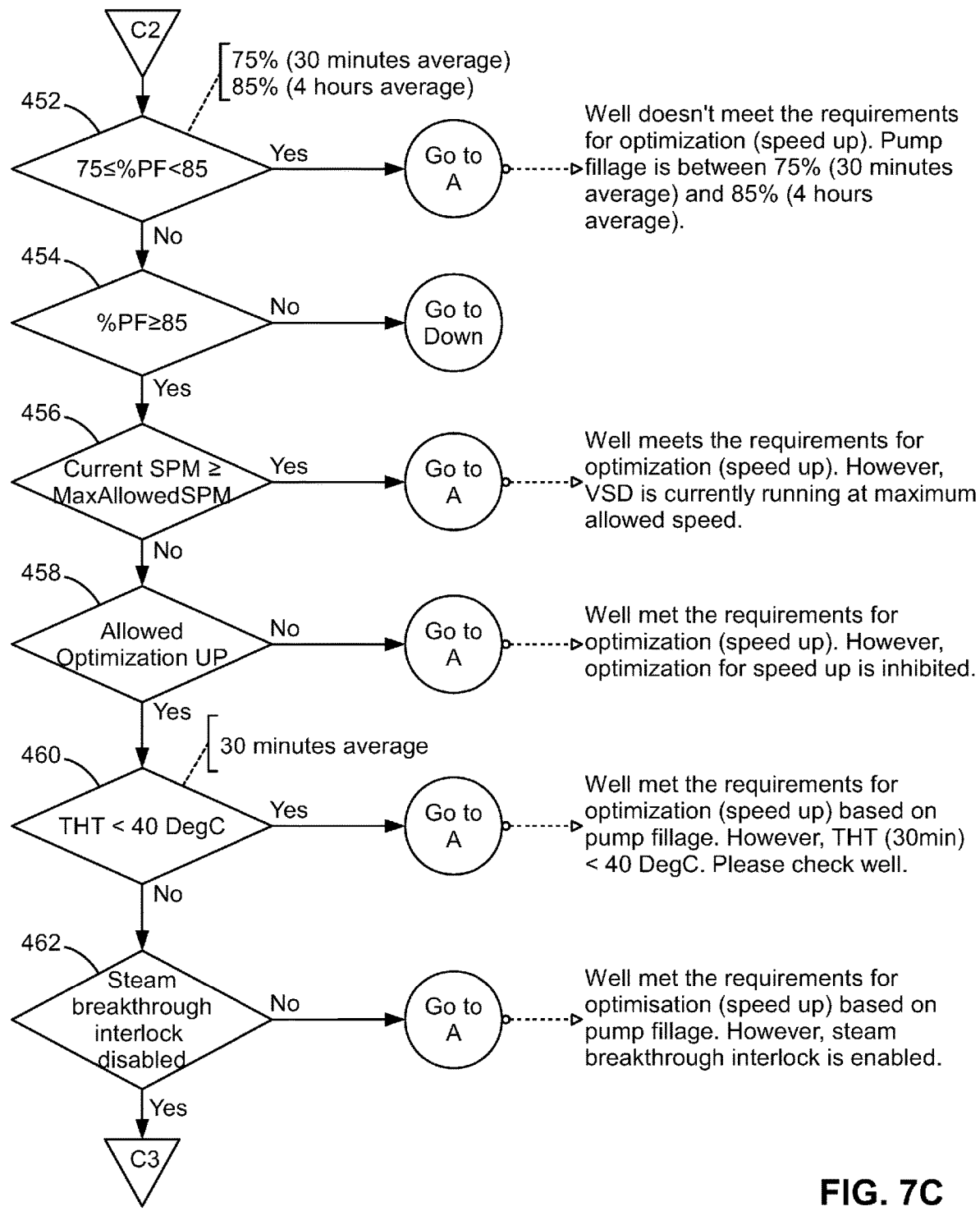
Figure 7D:
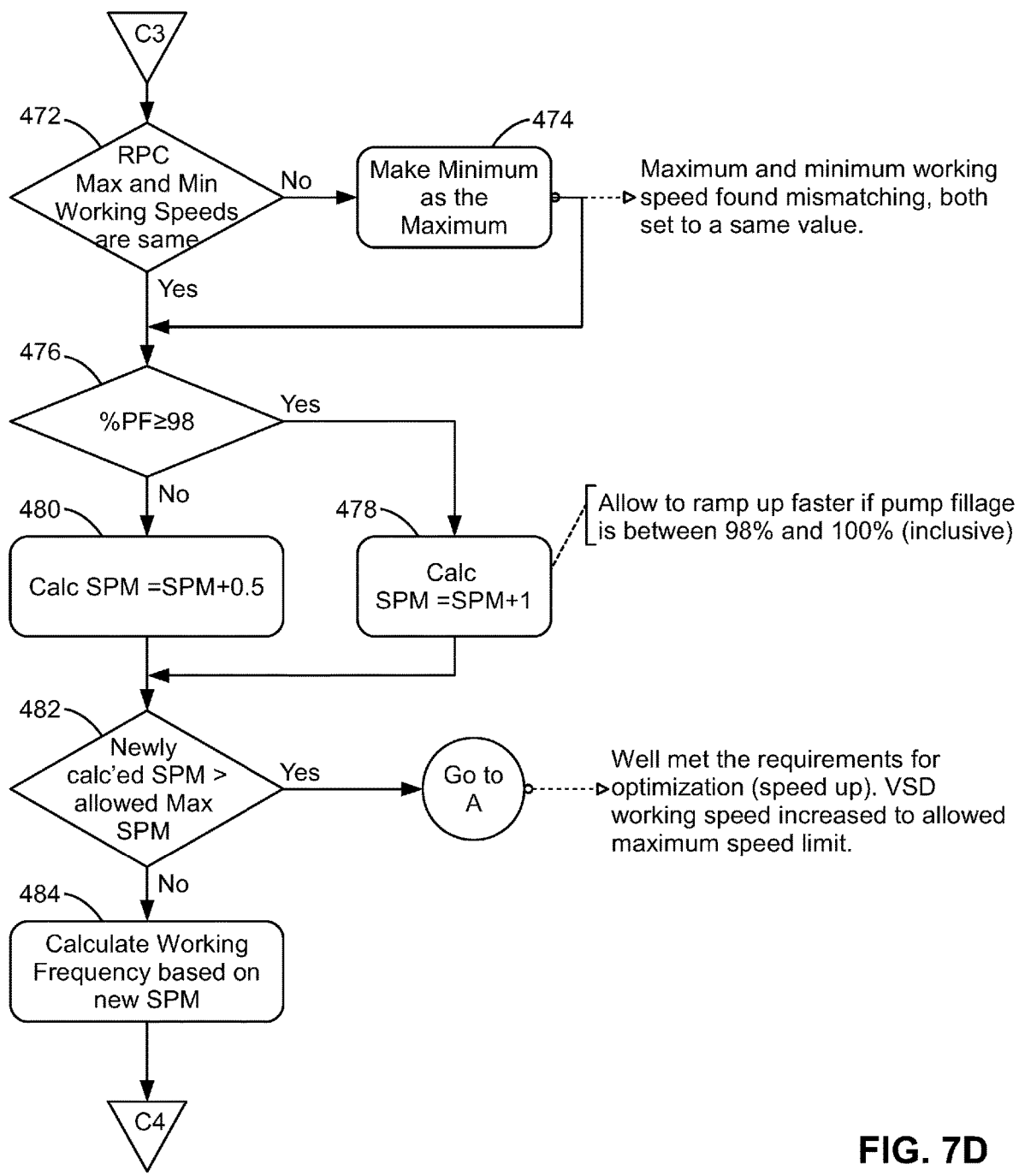
Figure 7E:
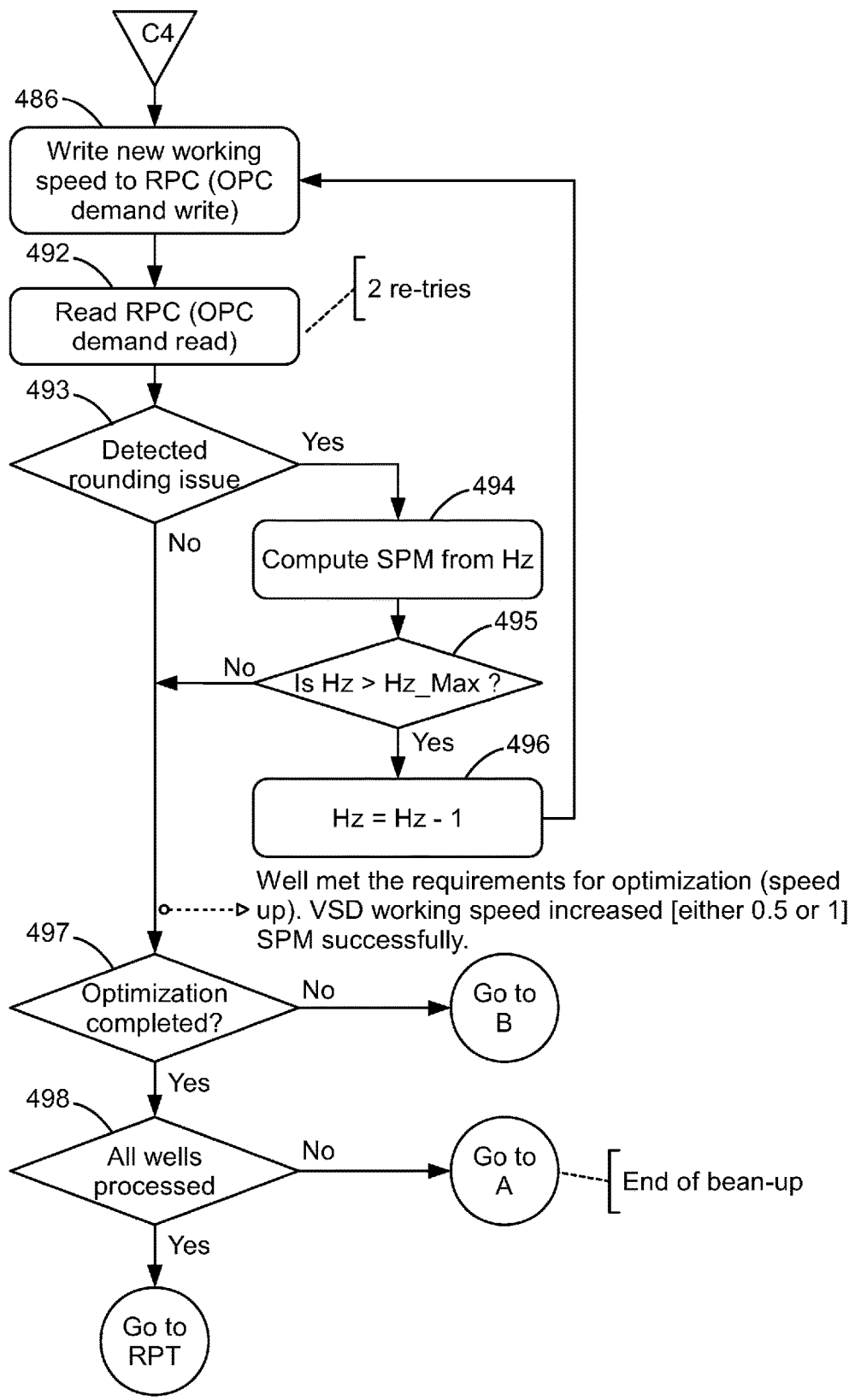
Figure 7F:
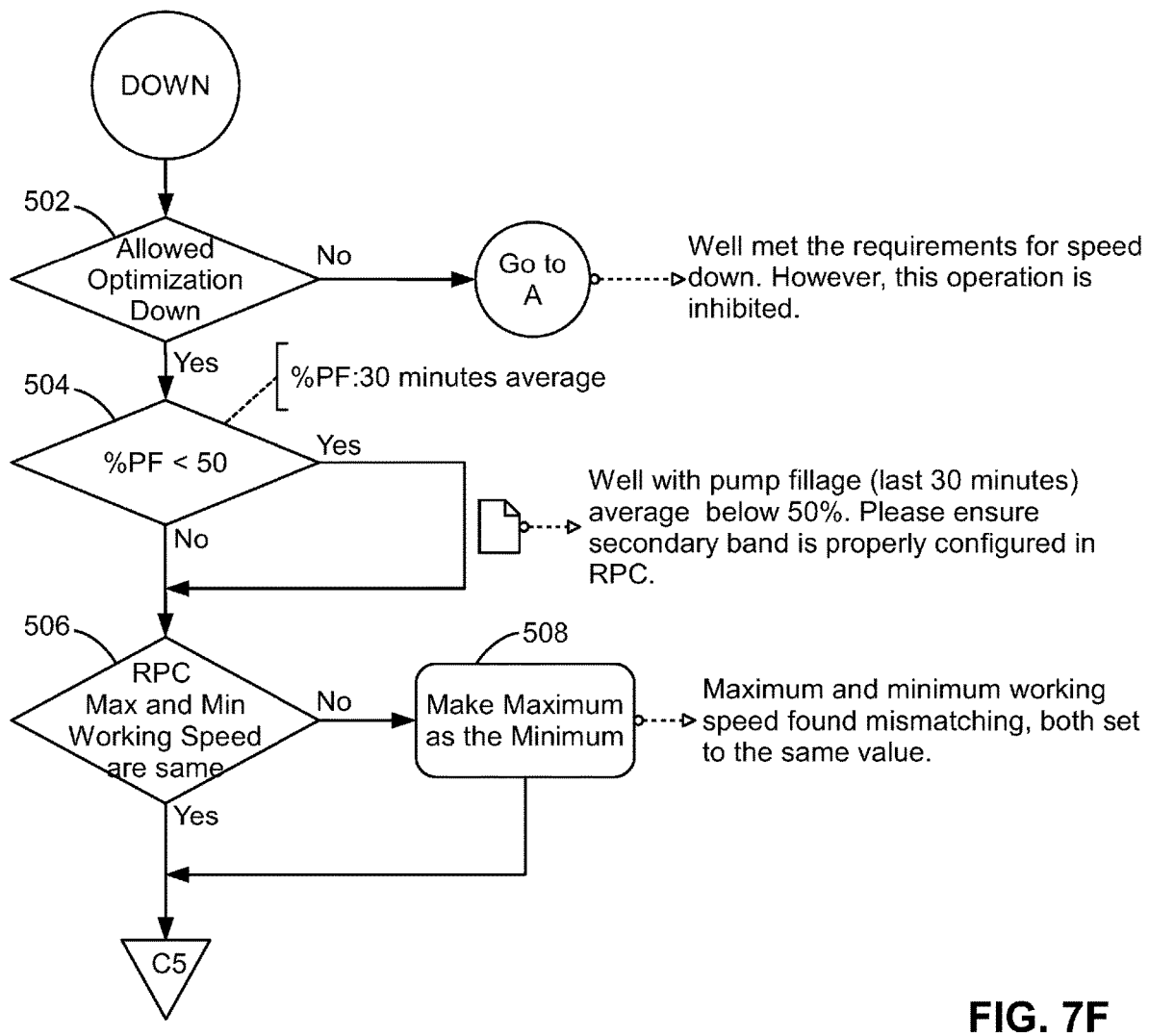
Figure 7G:
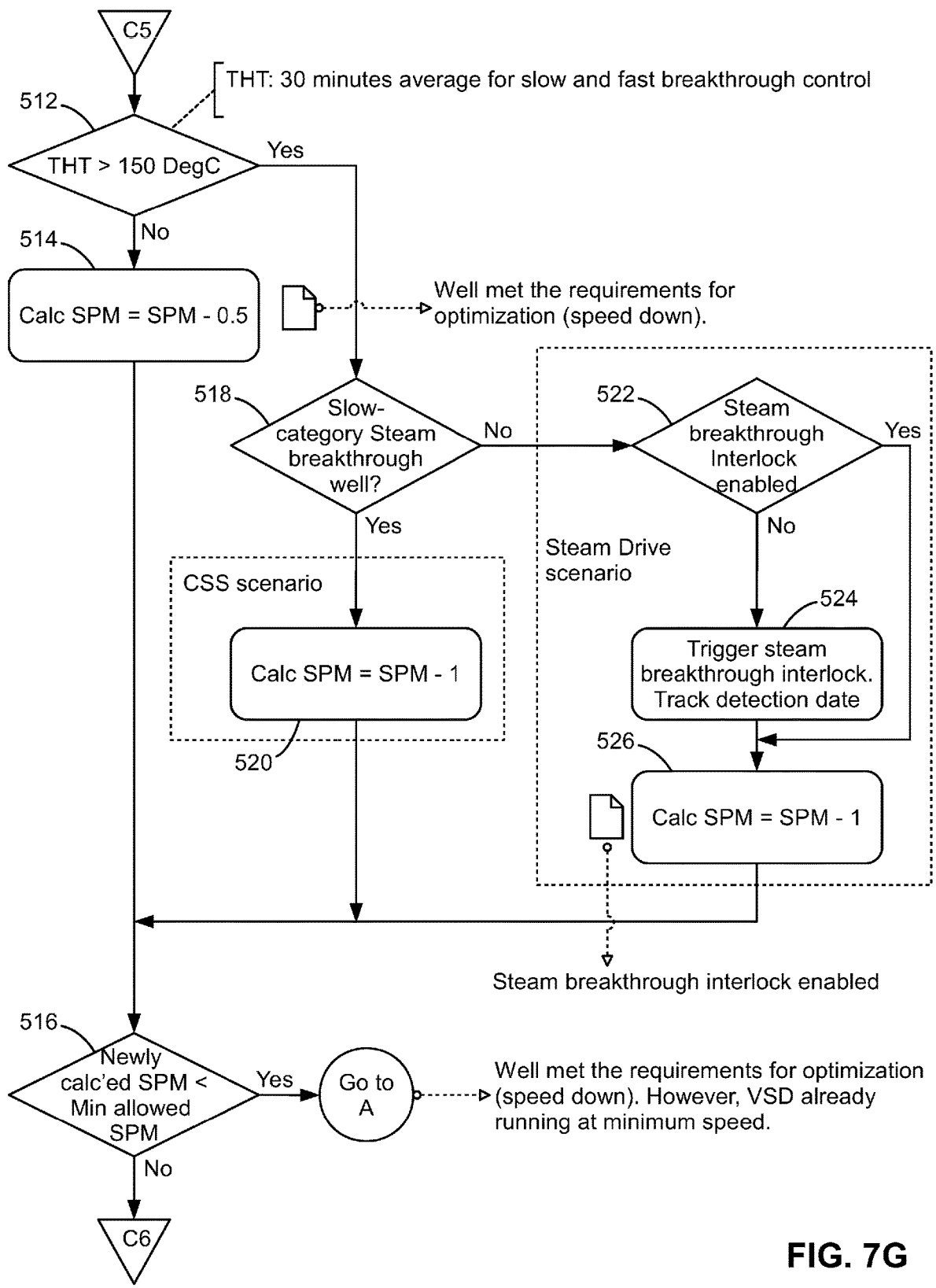
Figure 7H:
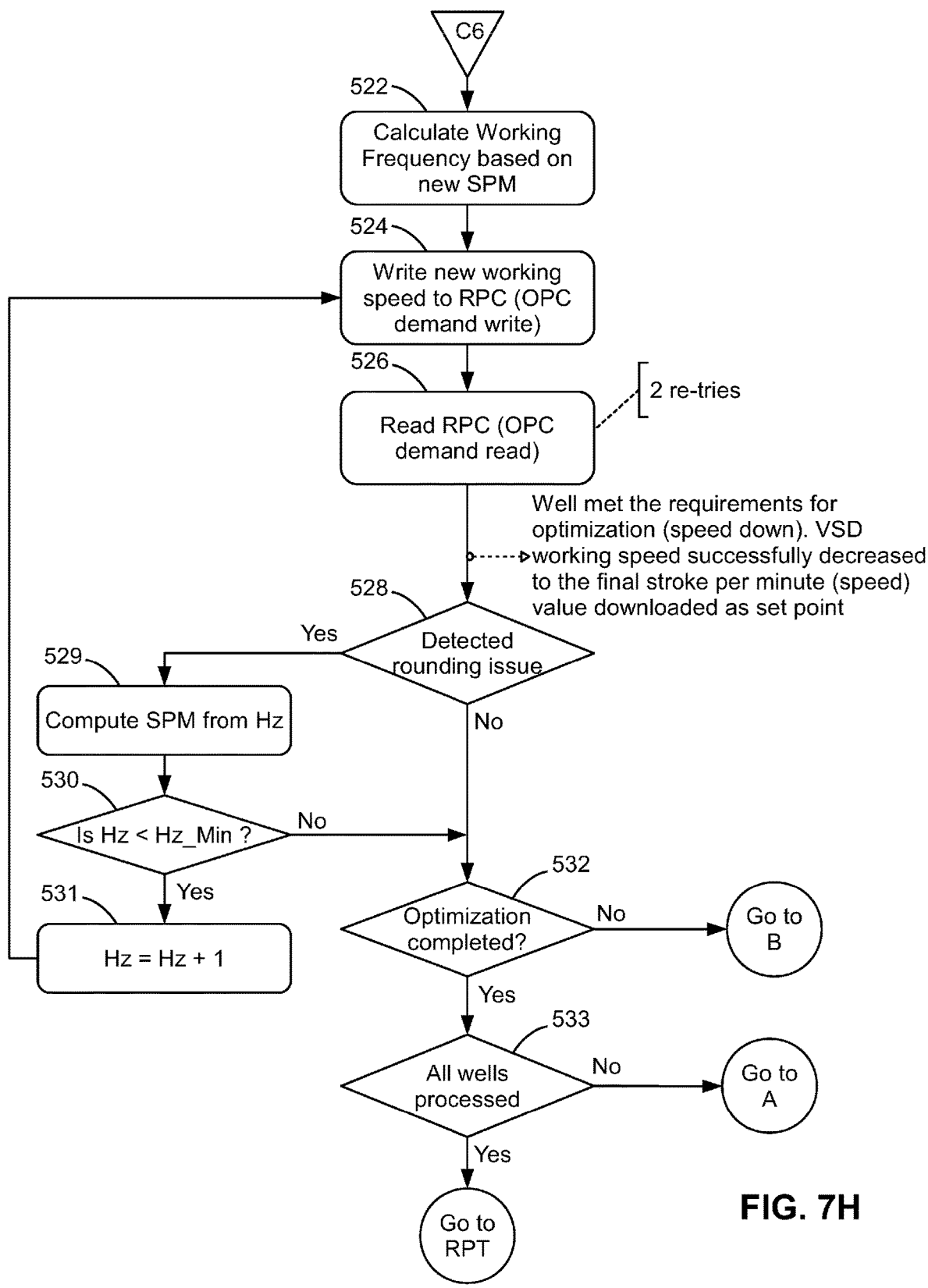
Figure 7I:
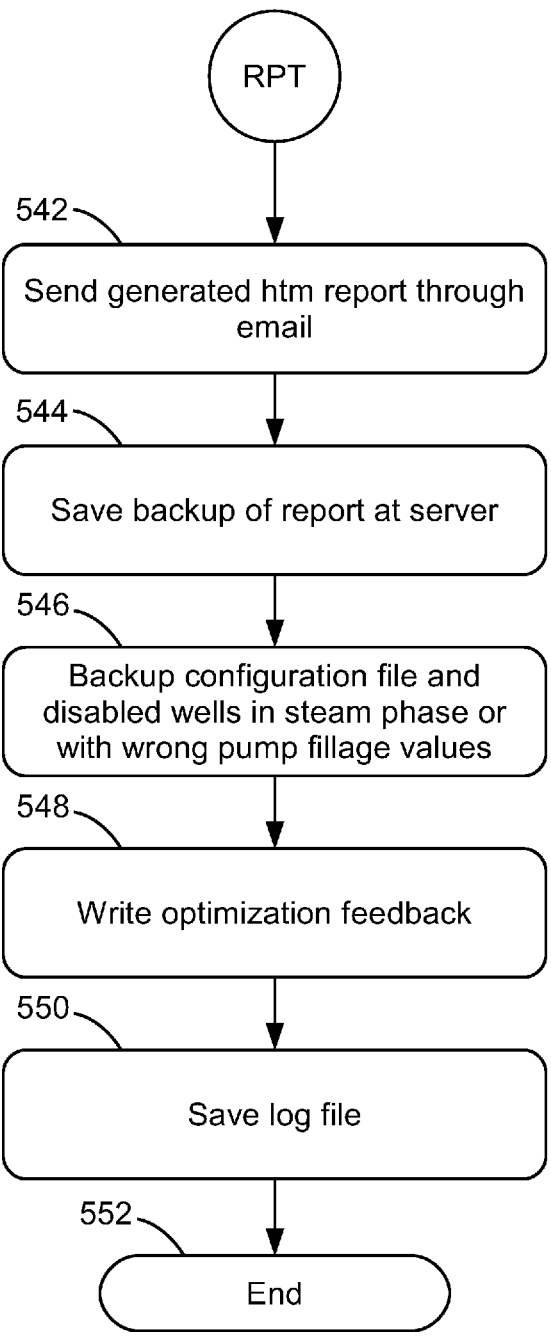

FIGS. 7A to 7I show a flowchart illustrating a process 400 implementing the process 360 in one embodiment for optimizing oil production in accordance with the customizable algorithm 342. FIGS. 7A to 7E show a speed-up-production sub-process of the process 400 for starting well-optimization and for optimizing the wells to increase the production rate. FIGS. 7F to 7H show a slowing-down-production sub-process of the process 400 for optimizing the wells to decrease the production rate. FIG. 7I shows a reporting sub-process of the process 400 for reporting.

As shown in FIG. 7A, after the process 400 starts (step 402), the customizable algorithm submodule 342 reads a configuration file from the configuration submodule 328 and processes a first enabled well (step 404). The customizable algorithm submodule 342 then reads the historical data of the enabled well such as pump efficiency which is measured as pump fillage (PF) in this embodiment, and averages of THT (such as 24-hour, 4-hour and 30-minute averages of THT) from the data historian submodule 318 such as the PI System® (step 406), and reads the RPC data from the oil-production device 106 via an OPC demand-read command with two retries (step 408).

At step 410, the customizable algorithm submodule 342 checks if the OPC command at step 408 is successful. If the OPC command at step 408 is unsuccessful, the well is not communicating, and the system 100 cannot check the well for optimization opportunities. An alert is sent to the user to report the communication failure of the well and ask the user to contact a service team. The process 400 then goes through the connector A to step 412 to select a next enabled well in the configuration submodule 328, and then loops to step 406 to process the selected well.

If at step 410, the OPC command is successful, the current maximum and minimum oil-lifting speeds which may be measured in strokes-per-minute (SPM) in some embodiments, are calculated using the static model and the RPC status is parsed (step 414). At step 416, the customizable algorithm submodule 342 checks the rod-pump running state and a four-hour average of THT. If the rod pump is not running in its normal state and the four-hour average of THT is greater than 280 degrees Celsius (also denoted as ° C. or DegC), the well is likely under the steam phase or steam injection mode and therefore, the well is disabled in the configuration submodule 328 (step 418). The process 400 then goes through the connector A to step 412 to select and process a next enabled well.

If at step 416, it is determined that the rod pump is running in its normal state or the four-hour-average THT is less than or equal to 280° C., the customizable algorithm submodule 342 further checks if the rod pump is running in its normal state (step 422). If the rod pump is not running in its normal state, an alert is sent to the user for checking the well, and the process 400 goes through the connector A to step 412 to select and process a next enabled well.

If at step 422, it is determined that the rod pump is running in its normal state, the process goes to step 432 in FIG. 7B.

Referring to FIG. 7B, at step 432, the customizable algorithm submodule 342 checks the validity of the historical data obtained from the data historian module 318 including the 4-hour-average THT and a four-hour average of PF percentage (denoted as "% PF" hereinafter). If less than 70% of the historical data is valid, there is no enough good data for production optimization. An alert is sent to the user for checking the data historian module 318 such as reminding the user to contact the administrator of the historian database. The process 400 then goes through the connector A to step 412 to select and process a next enabled well.

If at step 432, it is determined that 70% or more of the historical data is valid, the customizable algorithm submodule 342 checks the validity of the pump fillage data. If the % PF is not within 0 and 100, the pump fillage data obtained from the RPC 146 is invalid. Therefore, the well is disabled in the configuration submodule 328 (step 436), and the process 400 goes through the connector A to step 412 to select and process a next enabled well.

If at step 432, it is determined that the % PF is between 0 and 100, the customizable algorithm submodule 342 checks the status of a VFD motor of the production well (step 438). If a "noRPM" alarm is received which indicates that the VFD motor is not in operation and thus its rpm is zero (0), the RPC 146 has a "noRPM" violation triggered and the oil-production device 106 is likely not properly functioning. Therefore, although the well meets the requirements for optimization to increase the production rate, the optimization to the well is terminated. In these embodiments, an alert is sent to the user for investigation. However, the well is not disabled in order to maintain production.

The process 400 then goes through the connector A to step 412 to select and process a next enabled well.

If there is no "noRPM" alarm at step 438, the customizable algorithm submodule 342 further checks if there is a "noCrank" alarm (step 440). If there is a "noCrank" alarm, it indicates that the RPC 146 has a "noCrank" violation triggered and the oil-production device 106 is likely not properly functioning. Therefore, although the well meets the requirements for optimization to increase the production rate, the optimization to the well is terminated. In these embodiments, an alert is sent to the user for investigation. However, the well is not disabled in order to maintain production.

The process 400 then goes through the connector A to step 412 to select and process a next enabled well.

If there is no "noCrank" alarm at step 440, the customizable algorithm submodule 342 further checks if the steam-breakthrough interlock has been enabled for at least seven (7) days (step 442). If not, the process 400 goes to step 446 with the steam-breakthrough interlock maintained as enabled. If the steam-breakthrough interlock has been enabled for at least a predetermined or user-specified steam-breakthrough period of time such as seven (7) days, the steam-breakthrough interlock is disabled (step 444). A report is generated by the reporting submodule 348 (see FIG. 5A) and sent to the user. Steps 442 and 444 thus ensure that the steam-breakthrough interlock is always disabled after being enabled for seven days. The process 400 then goes to step 446.

At step 446, the customizable algorithm submodule 342 obtains a 30-minute average THT for slow and fast breakthrough control. The customizable algorithm submodule 342 then checks if the average THT is greater than 150° C. If the average THT is greater than 150° C., the process 400 goes through the connector DOWN to step 502 of the slowing-down-production sub-process. If the average THT is not greater than 150° C., the process 400 goes to step 452 shown in FIG. 7C.

Referring to FIG. 7C, the customizable algorithm submodule 342 checks if a 30-minute average of PF is greater than or equal to 75% and a four-hour average of PF is less than 85% (denoted as "if 75≤% PF<85") (step 452).

If 75≤% PF≤85, the well does not meet the requirements for optimization to increase the production rate, the optimization to the well is terminated and the process 400 goes through the connector A to step 412 to select and process a next enabled well.

If at step 452, it is determined that the PF is not within the 75% and 85% range, the customizable algorithm submodule 342 further checks if the four-hour average of PF is greater than or equal to 85% (step 454). If the four-hour average of PF is less than 85%, the process 400 goes through the connector DOWN to step 502 of the slowing-down-production sub-process.

If at step 454, it is determined that the four-hour average of PF is greater than or equal to 85%, the customizable algorithm submodule 342 checks if the current oil-lifting speed (for example, the current the VSD speed measured in SPM) is greater than or equal to the allowed maximum oil-lifting speed (denoted as "MaxAllowedSPM") calculated at step 414 (step 456). If the current oil-lifting speed is greater than or equal to MaxAllowedSPM, the VSD is currently running at the allowed maximum oil-lifting speed. Although the well meets the requirements for optimization to increase the production rate, the optimization to the well is terminated and the process 400 goes through the connector A to step 412 to select and process a next enabled well.

If at step 456, it is determined that the current oil-lifting speed is less than MaxAllowedSPM, the customizable algorithm submodule 342 checks if the well is allowed to increase the production rate (step 458). If not, optimization for increasing the production rate of the well is inhibited. Although the well meets the requirements for optimization to increase the production rate, the optimization to the well is terminated and the process 400 goes through the connector A to step 412 to select and process a next enabled well.

If at step 458, it is determined that the well is allowed to increase the production rate, the customizable algorithm submodule 342 obtains a 30-minute average of the THT (step 460). If the 30-minute-avergae THT is lower than 40° C., the well condition needs to be checked. Although based on pump fillage, the well meets the requirements for optimization to increase the production rate, the optimization to the well is terminated. An alert is sent to the user for checking the well and the process 400 goes through the connector A to step 412 to select and process a next enabled well.

If at step 460, it is determined that the 30-minute-avergae THT is greater than or equal to 40° C., the customizable algorithm submodule 342 checks the status of the steam-breakthrough interlock (step 462). If the steam-breakthrough interlock is enabled, the optimization to the well is terminated although the well meets the requirements for optimization to increase the production rate, and the process 400 goes through the connector A to step 412 to select and process a next enabled well.

If at step 462, it is determined that the steam-breakthrough interlock is disabled, the process 400 goes to step 472 shown in FIG. 7D.

Referring to FIG. 7D, the customizable algorithm submodule 342 checks if the RPC maximum and minimum working speeds are same (step 472), and if not, the RPC minimum working speed is set to equal to the maximum working speed (step 474).

At step 476, the customizable algorithm submodule 342 checks if the averaged PF over a predefined period of time (denoted as PF average/delta Time, such as averaged PF over 30 minutes) is greater than or equal to 98% (i.e., if the averaged PF is between 98% and 100% inclusive). If the averaged % PF≥98, a target oil-lifting speed for the VSD is calculated as the current oil-lifting speed increased by a predetermined first speed incremental value such as one stroke-per-minute (step 478); otherwise if the averaged PF is less than 98%, the target oil-lifting speed for the VSD is calculated as the current oil-lifting speed increased by a predetermined second speed incremental value such as 0.5 stroke per minute that is smaller than the first speed incremental value (step 480).

At step 482, the customizable algorithm submodule 342 checks if the target oil-lifting speed calculated at step 478 or 480 is greater than the allowed maximum speed. If yes, the VSD working speed to be increased would be over the allowed maximum speed, and therefore, the optimization to the well is terminated although the well meets the requirements for optimization to increase the production rate. The process 400 then goes through the connector A to step 412 to select and process a next enabled well.

If at step 482, it is determined that the VSD working speed to be increased would not be over the allowed maximum speed, the customizable algorithm submodule 342 calculates a working frequency of the VFD based on the target oil-lifting speed (step 484). The process 400 then goes to step 486 shown in FIG. 7E.

Referring to FIG. 7E, the customizable algorithm submodule 342 writes the new working speed obtained at step 484 to RPC via an OPC demand-write (step 486). In response, the RPC increases the speed of the VSD to the target oil-lifting speed to increase the production rate.

The customizable algorithm submodule 342 then reads the RPC data from the oil-production device 106 via an OPC demand-read command with two retries (step 492). Then, the customizable algorithm submodule 342 checks if there is any detected rounding issue (step 493).

A rounding issue is an artifact to resolve limitation on the RPC's unit which only processes integer values. In particular, it is required that the frequency-control speed set-point needs to be defined as integer data only. Therefore the calculated frequency, which is a float data type, needs to be rounded to an integer value.

When a rounding issue is detected, a rounding logic as shown in steps 494 to 496 increments and/or decrements the frequency with small steps until the float feedback matches the set point integer. In particular, if any rounding issue is detected, the parameter spm limit reached is enabled and MinWorkingSpeedHzRPC and MaxWorkingSpeedHzRPC are reduced by one Hz. In particular, the customizable algorithm submodule 342 calculates the speed from the VFD working frequency in Hz (step 494), and checks if the VFD working frequency is greater than a predefined parameter Hz_Max (step 495). If the VFD working frequency is greater than the predefined parameter Hz_Max, the VFD working frequency is reduced by one Hz (step 496) and the process 400 loops back to step 486.

If at step 495, the VFD working frequency is not greater than the predefined parameter Hz_Max, the optimization of the well for increasing the production rate is completed and the process 400 goes to step 497 to check if the optimization is completed for example, if the current oil-lifting speed needs to be further increased. If the optimization is not yet completed, the process 400 goes to step 406 through the connector B for further optimization. If the optimization is completed, the customizable algorithm submodule 342 checks if all wells have been processed (step 498). If not all wells have been processed, the process 400 goes through the connector A to step 412 to select and process a next enabled well. If all wells have been processed, the process 400 goes to the REPORT sub-process shown in FIG. 7I.

FIGS. 7F to 7H show the slowing-down-production sub-process of the process 400. As shown in FIG. 7F, the customizable algorithm submodule 342 first checks if the well is allowed to decrease the production rate (step 502). If not, the process 400 goes through the connector A to step 412 to select and process a next enabled well.

If the well is allowed to decrease the production rate, the customizable algorithm submodule 342 checks if the average PF in last 30 minutes is less than 50% (step 504). If % PF<50, a report is generated by the reporting submodule 348 and is sent to the user indicating that the average pump fillage of the well in last 30 minutes is below 50% and that it is needed to ensure the secondary band be properly configured in the RPC.

At step 506, the customizable algorithm submodule 342 checks if the RPC maximum and minimum working speeds are same and if not, the RPC maximum working speed is set to equal to the minimum working speed (step 508). The process 400 then goes to step 512 shown in FIG. 7G.

Referring to FIG. 7G, the customizable algorithm submodule 342 obtains a 30-minute average THT for slow-breakthrough and fast-breakthrough control and checks if the 30-minute average THT is greater than 150° C. (step 512). If the 30-minute average THT is not greater than 150° C., the customizable algorithm submodule 342 reduces the oil-lifting speed for example by a predetermined first speed decremental value such as 0.5 stroke per minute (step 514) and a report is generated by the reporting submodule 348 indicating that the well meets the requirements for optimization to decrease the production rate. The process 400 then goes to step 516.

If at step 512, it is determined that the 30-minute average THT is greater than 150° C., the customizable algorithm submodule 342 checks if the production well is a slow-category steam breakthrough well (step 518). If the production well is a slow-category steam breakthrough well (which may be the case in a cyclic steam stimulation (CSS) scenario), the customizable algorithm submodule 342 calculates a new oil-lifting speed for example by reducing the current oil-lifting speed by a predetermined second speed decremental value (such as one stroke per minute) that is greater than the first speed decremental value (step 520). The process 400 then goes to step 516.

If at step 518, it is determined that the production well is not a slow-category steam breakthrough well (which may be the case in a steam drive scenario), the customizable algorithm submodule 342 checks if steam-breakthrough interlock is enabled (step 522). If yes, the process 400 goes to step 526.

If at step 522, it is determined that the steam-breakthrough interlock is disabled, the customizable algorithm submodule 342 triggers or enables the steam-breakthrough interlock and tracks the detection date of steam breakthrough (step 524). The customizable algorithm submodule 342 then calculates a new oil-lifting speed, for example by reducing the current oil-lifting speed by the second speed decremental value (step 526). A report is generated by the reporting submodule 348 indicating that steam breakthrough is enabled. The process 400 then goes to step 516.

At step 516, the customizable algorithm submodule 342 checks if the newly calculated oil-lifting speed is smaller than the allowed minimum speed. If the newly calculated oil-lifting speed is smaller than the allowed minimum speed, the VFD is already running at the allowed minimum speed. Therefore, although the well meets the requirements for optimization to decrease the production rate, the optimization to the well is terminated and the process 400 goes through the connector A to step 412 to select and process a next enabled well.

If at step 516, it is determined that the newly calculated oil-lifting speed is greater than or equal to the allowed minimum speed, the process goes to step 522 shown in FIG. 7H.

Referring to FIG. 7H, the customizable algorithm submodule 342 calculates a working frequency of the RPC based on the new speed (step 522), and writes the new working speed to RPC via an OPC demand-write (step 524). In response, the RPC then decreases the speed of the VSD to the new speed to decrease the production rate.

At step 526, the customizable algorithm submodule 342 reads the RPC data from the oil-production device 106 via an OPC demand-read command with two retries. Then, the customizable algorithm submodule 342 checks if there is any detected rounding issue (step 528). If any rounding issue is detected, the customizable algorithm submodule 342 calculates the speed from the VFD working frequency in Hz (step 529), and checks if the VFD working frequency is smaller than a predefined parameter Hz_Min (step 530). If the VFD working frequency is smaller than the predefined parameter Hz_Min, the VFD working frequency is increased by one Hz (step 531) and the process 400 loops back to step 524.

If the VFD working frequency is not smaller than the predefined parameter Hz_Min, the optimization of the well to decrease the production rate is completed and the process 400 goes to step 532 to check if the optimization is completed, for example, if the current speed needs to be further reduced. If the optimization is not yet completed, the process 400 goes to step 406 through the connector B for further optimization. If the optimization is completed, the customizable algorithm submodule 342 then checks if all wells have been processed (step 533). If not all wells have been processed, the process 400 goes through the connector A to step 412 to select and process a next enabled well. If all wells have been processed, the process 400 goes to the REPORT sub-process shown in FIG. 7I.

FIG. 7I shows the reporting sub-process of the process 400. As shown, the customizable algorithm submodule 342 may generate a Hypertext Markup Language (HTML) report and send the generated HTML report to one or more users via emails, text messages, and/or the like (step 642). The customizable algorithm submodule 342 may save a backup of the report at one or more backup servers (step 544). The customizable algorithm submodule 342 may backup configuration file and the disabled wells in steam phase or with wrong pump fillage values (step 546). In embodiments that a PI System® is used as the data historian 318, the customizable algorithm submodule 342 may write optimization feedback (step 548) and save optimization logs to a log file (step 550). The process 400 then ends (step 552).

The system 100 actively controls and/or optimizes remote oil and/or gas production devices or systems such as artificial-lifting systems to run within a desired or predefined envelope based on quantifiable and measurable parameters. The system 100 may be used for controlling a plurality of wells as need, and may optimize one or more wells a plurality of times as needed in any period of time.

For each production well, the system 100 first analyzes and diagnoses one or more measurable parameters collected from a variety of sources and determines whether the production well is suitable for optimization. The system 100 then optimizes the production of the well if the well is suitable for optimization, As illustrated in above embodiments, the system 100 first analyzes and diagnoses one or more measurable parameters collected from a variety of sources including the oil-production devices 106, the data historian module 318, well-status monitoring subsystem 334, third-party system 322, database 344, and/or other discretionary parameters 336.

In the example shown in FIGS. 7A to 7I, the system monitors the status of a production well and determines whether the production well is suitable for optimization based on a set of conditions such as the communication status with the production well, the running state of the production well, the historical data validity, the historical PF data, RPM and crank status, steam breakthrough status, the historical THT data, well setting regarding whether or not the well is allowable for optimization, RPC data, and/or the like.

If the production well is suitable for optimization, the system 100 optimizes the production well based on the PF data. In some embodiments, the system 100 may optimize one or more production wells based on a variety of parameters, conditions, and requirements such as one or more economical thresholds, well integrity, operational requirements and parameters, gas rising, temperature, pressure, flow rate or vibration, failure model prediction, and the like. In various embodiments, the one or more economical thresholds may be an oil price, water cut, a gas-to-oil ratio, power consumption, water processing cost, and/or the like.

Based on the optimization results, the production well may increase its production rate, decrease its production rate, maintaining its current production rate, turn-off, set or adjust timer to run or pause the production well at user-scheduled time and for user-specified duration, and the like. The execution of such optimizations or control is conducted with real-time diagnosis, thereby leading to the desired response or outcome.

Thus, the system 100 offers significant flexibility on the parameters to be used and/or the reference to control quantifiable, measurable and benched factors that are defined by the user as critical factors.

In some embodiments, one or more oil-production devices 106 may comprise one or more software or firmware programs, and some functions shown in FIG. 5A may be implemented on such oil-production devices 106.

Although in above embodiments, the system 100 and process 400 are described for controlling oil-production, in some embodiments, the system 100 and process 400 may be used for controlling gas production by using relevant gas-production parameters such as choke, liquid loading, and/or the like, and suitable thresholds thereof.

Although embodiments have been described above with reference to the accompanying drawings, those of skill in the art will appreciate that variations and modifications may be made without departing from the scope thereof as defined by the appended claims.

LIST OF ACRONYMS

API: application programming interface
CSS: cyclic steam stimulation
DCS: distributed control system
GPS: Global Positioning System
GUI: graphic user interface
HID: human interface device
HTML: Hypertext Markup Language
LAN: local area network
MAN: metropolitan area network
OLE: Object Linking & Embedding protocol
OPC: OLE Process Control
PDA: Personal Digital Assistant
PF: pump fillage
PLC: programmable logic controller
PVT: pressure, temperature, and volume
RPC: rod pump controller
rpm: revolutions per minute
RTU: remote terminal unit
SCADA: Supervisory Control and Data Acquisition
SMTP: Simple Mail Transfer Protocol
SPM: strokes-per-minute
THP: pressures such as tubing head pressure
THT: tubing head temperature
VFD: variable frequency drive
VSD: variable speed drive
WAN: wide area network

What is claimed is:

1. A computerized method for optimizing the operation of one or more oil or gas production wells, each well comprising a corresponding production device, the method comprising: for each well,
   (i) collecting data of the well in real-time from one or more sources including one or more of a data historian module, a database, said production devices, a well-status monitoring subsystem, and an input/output interface;
   (ii) determining an optimization target based on said data;
   (iii) analyzing and diagnosing said data in real-time;
   (iv) determining whether the production well is suitable for optimization based on the analyzing and diagnosing result, the analyzing and diagnosing result comprising at least one of historical pump efficiency data, variable frequency drive (VFD) motor status, historical tubing-head temperature (THT) data, one or more economical thresholds, basic sediment and water, and tubing-head pressure (THP); and
   (v) if the production well is suitable for optimization, optimizing the production well based on at least the historical pump efficiency data by increasing a production rate, decreasing a production rate, maintaining a current production rate, turning-off, or configuring a timer to run or pause the production well at a user-scheduled time and for a user-specified duration,
   wherein said historical pump efficiency data comprises historical pump fillage (PF) data; and wherein said determining whether the production well is suitable for optimization comprises the steps of:
   (1) communicating with the production well for reading the RPC data and determining that the production well is not suitable for optimization if the production well is not in communication;
   (2) calculating a maximum and minimum speeds of a variable frequency drive (VFD) of the production well using a static model and the RPC data;
   (3) checking the pump running state and a first average of THT over a first THT-averaging period of time, determining that the production well is not suitable for optimization and disabling the production well if the rod pump is not running in its normal state and the first average of THT is greater than a first temperature threshold, and determining that the production well is not suitable for optimization if the rod pump is not running in its normal state;
   (4) checking the validity of the historical data, said historical data comprising the first average of THT and a first average of PF over a first PF-averaging period of time, and determining that the production well is not suitable for optimization if less than a first threshold percentage of the historical data is valid;
   (5) checking the validity of the first average of PF and determining that the production well is not suitable for optimization if the first average of PF is not within 0 and 100%;
   (6) checking the status of a VFD motor of the production well and determining that the production well is not suitable for optimization if the VFD motor is not in operation;
   (7) checking the status of a production device of the production well and determining that the production well is not suitable for optimization if the production device of the production well is not properly functioning;
   (8) checking steam-breakthrough interlock, and if the steam-breakthrough interlock has been enabled for at least a predetermined or user-specified steam-breakthrough period of time, disabling the steam-breakthrough interlock and generating a report via the reporting sub-process;
   (9) checking if a second average of THT over a second THT-averaging period of time is greater than a second temperature threshold and executing a slowing-down-production sub-process if the second average of THT is greater than the second temperature threshold;
   (10) determining that the production well is not suitable for optimization if the first average of PF is less than a second threshold percentage and a second average of PF over a second PF-averaging period of time is greater than a third threshold percentage;
   (11) executing the slowing-down-production sub-process if the first average of PF is greater than or equal to the second threshold percentage;
   (12) checking a current oil-lifting speed and determining that the production well is not suitable for optimization if the current oil-lifting speed is greater than or equal to the calculated maximum speed;
   (13) checking the setting of the production well and determining that the production well is not suitable for optimization if production well is not allowed to increase the production rate;
   (14) checking the second average of THT and determining that the production well is not suitable for optimization if the second average of THT is less than a third temperature threshold;

(15) checking the status of the steam-breakthrough interlock, determining that the production well is not suitable for optimization if the steam-breakthrough interlock is enabled; and

(16) determining that the production well is suitable for optimization.

2. The method of claim 1, wherein said data comprises at least one of temperature downhole, temperature at surface, pressure downhole, pressure at surface, pump intake pressure downhole, pump intake pressure at surface, pump discharge pressure downhole, pump discharge pressure at surface, the one or more economical thresholds, vibration, water cuts, fluid levels, target flow rates or flow rate limitations, pump efficiency, torque, frequency, speed, startup strategy, gas-to-oil ratio, well integrity, operational requirements and parameters, and failure model prediction.

3. The method of claim 1, wherein the one or more economical thresholds comprise at least one of an oil price, a lifting cost, and a processing cost.

4. The method of claim 1, wherein the step (v) comprises:
if the optimization target is to increase or decrease the current production rate to a target production rate, increasing or decreasing the current production rate by a predefined rate-incremental or rate-decremental, respectively, the rate-incremental or rate-decremental being smaller than what is required for adjusting the current production rate to the target production rate; and the method further comprising:
(vi) repeating steps (i) to (v) until the optimization target is reached.

5. The method of claim 1, wherein said optimizing the production well comprises the steps of:
(17) setting the maximum and minimum working speeds to a same speed if the maximum and minimum working speeds are different;
(18) calculating a target oil-lifting speed for the VSD as the current oil-lifting speed increased by a first speed incremental value if the PF is greater than or equal to a fourth threshold percentage, or as the current oil-lifting speed increased by a second speed incremental value smaller than the first speed incremental value if the PF is not greater than the fourth threshold percentage;
(19) terminating the optimization of the production well if the target oil-lifting speed is greater than the maximum speed;
(20) calculating a working frequency of the VFD based on the target oil-lifting speed;
(21) setting the speed of the VSD as the calculated working frequency for increasing the production rate;
(22) communicating with the production well and checking if there is any detected rounding issue; and
(23) if a rounding issue is detected, calculating a frequency value from the speed of the VSD, and if the frequency value is greater than a maximum frequency value, reducing the frequency value by a frequency decremental value and proceeding to step (21).

6. The method of claim 1, wherein said slowing-down-production sub-process comprises the steps of:
(24) checking the setting of the production well and determining that the production well is not suitable for optimization if production well is not allowed to decrease the production rate;
(25) checking the second average of PF and if the second average of PF is less than a fifth threshold percentage, generating a report via the reporting sub-process;
(26) if the RPC maximum and minimum working speeds are not same, setting the RPC maximum and minimum working speeds to a same speed;
(27) checking if the second average of THT is greater than the second temperature threshold;
(28) calculating a target oil-lifting speed for the VSD as the current oil-lifting speed decreased by a first speed decremental value and generating a report via the reporting sub-process if the second average of THT is smaller than or equal to the second temperature threshold;
(29) calculating the target oil-lifting speed for the VSD as the current oil-lifting speed decreased by a second speed decremental value that is greater than the first speed decremental value, if the second average of THT is greater than the second temperature threshold and the production well is a slow-category steam breakthrough well;
(30) calculating the target oil-lifting speed for the VSD as the current oil-lifting speed decreased by the second speed decremental value, and generating a report via the reporting sub-process, if the second average of THT is greater than the second temperature threshold, the production well is not a slow-category steam breakthrough well, and the steam-breakthrough interlock is enabled;
(31) triggering the steam-breakthrough interlock, tracking the detection date of steam breakthrough, calculating the target oil-lifting speed for the VSD as the current oil-lifting speed decreased by the second speed decremental value, and generating a report via the reporting sub-process, if the second average of THT is greater than the second temperature threshold, the production well is not a slow-category steam breakthrough well, and the steam-breakthrough interlock is disabled;
(32) terminating the optimization of the production well if the target oil-lifting speed is smaller than the minimum speed;
(33) calculating the working frequency of the VFD based on the target oil-lifting speed;
(34) setting the speed of the VSD as the calculated working frequency for decreasing the production rate;
(35) communicating with the production well and checking if there is any detected rounding issue; and
(36) calculating a frequency value from the speed of the VSD, and if the frequency value is less than a minimum frequency value, increasing the frequency value by a frequency incremental value and proceeding to step (34).

7. A system for optimizing one or more oil or gas production wells, each well comprising a corresponding production device, the system comprising:
a memory;
a networking interface configured for communicating with each production device; and
at least one processing structure functionally coupled to the memory and the networking interface, the at least one processing structure being configured for: for each well,
(i) collecting data of the well in real-time from one or more sources including one or more of a data historian module, a database, said production devices, a well-status monitoring subsystem, and an input/output interface;
(ii) determining an optimization target based on said data;
(iii) analyzing and diagnosing said data in real-time;

(iv) determining whether the production well is suitable for optimization based on the analyzing and diagnosing result, the analyzing and diagnosing result comprising at least one of historical pump efficiency data, variable frequency drive (VFD) motor status, historical tubing-head temperature (THT) data, one or more economical thresholds, basic sediment and water, and tubing-head pressure (THP); and (v) if the production well is suitable for optimization, optimizing the production well based on the analyzing and diagnosing result by increasing a production rate, decreasing a production rate, maintaining a current production rate, turning-off, or configuring a timer to run or pause the production well at a user-scheduled time and for a user-specified duration;

wherein said historical pump efficiency data comprises historical pump fillage (PF) data; and wherein said determining whether the production well is suitable for optimization comprises the steps of:

(1) communicating with the production well for reading the RPC data and determining that the production well is not suitable for optimization if the production well is not in communication;

(2) calculating a maximum and minimum speeds of a variable frequency drive (VFD) of the production well using a static model and the RPC data;

(3) checking the pump running state and a first average of THT over a first THT-averaging period of time, determining that the production well is not suitable for optimization and disabling the production well if the rod pump is not running in its normal state and the first average of THT is greater than a first temperature threshold, and determining that the production well is not suitable for optimization if the rod pump is not running in its normal state;

(4) checking the validity of the historical data, said historical data comprising the first average of THT and a first average of PF over a first PF-averaging period of time, and determining that the production well is not suitable for optimization if less than a first threshold percentage of the historical data is valid;

(5) checking the validity of the first average of PF and determining that the production well is not suitable for optimization if the first average of PF is not within 0 and 100%;

(6) checking the status of a VFD motor of the production well and determining that the production well is not suitable for optimization if the VFD motor is not in operation;

(7) checking the status of a production device of the production well and determining that the production well is not suitable for optimization if the production device of the production well is not properly functioning;

(8) checking steam-breakthrough interlock, and if the steam-breakthrough interlock has been enabled for at least a predetermined or user-specified steam-breakthrough period of time, disabling the steam-breakthrough interlock and generating a report via the reporting sub-process;

(9) checking if a second average of THT over a second THT-averaging period of time is greater than a second temperature threshold and executing a slowing-down-production sub-process if the second average of THT is greater than the second temperature threshold;

(10) determining that the production well is not suitable for optimization if the first average of PF is less than a second threshold percentage and a second average of PF over a second PF-averaging period of time is greater than a third threshold percentage;

(11) executing the slowing-down-production sub-process if the first average of PF is greater than or equal to the second threshold percentage;

(12) checking a current oil-lifting speed and determining that the production well is not suitable for optimization if the current oil-lifting speed is greater than or equal to the calculated maximum speed;

(13) checking the setting of the production well and determining that the production well is not suitable for optimization if production well is not allowed to increase the production rate;

(14) checking the second average of THT and determining that the production well is not suitable for optimization if the second average of THT is less than a third temperature threshold;

(15) checking the status of the steam-breakthrough interlock, determining that the production well is not suitable for optimization if the steam-breakthrough interlock is enabled; and

(16) determining that the production well is suitable for optimization.

8. The system of claim 7, wherein said data comprises at least one of temperature downhole and/or at surface, pressure downhole and/or at surface, pump intake pressure downhole and/or at surface, pump discharge pressure downhole and/or at surface, the one or more economical thresholds, vibration, water cuts, fluid levels, target flow rates or flow rate limitations, pump efficiency, torque, frequency, speed measured in revolutions per minute (rpm) and/or in frequency, startup strategy, gas-to-oil ratio, well integrity, operational requirements and parameters, failure model prediction.

9. The system of claim 7, wherein the step (v) comprises:
if the optimization target is to increase or decrease the current production rate to a target production rate, increasing or decreasing the current production rate by a predefined rate-incremental or rate-decremental, respectively, the rate-incremental or rate-decremental being smaller than what is required for adjusting the current production rate to the target production rate; and the method further comprising:
(vi) repeating steps (i) to (v) until the optimization target is reached.

10. The system of claim 7, wherein said optimizing the production well comprises the steps of:
(17) setting the maximum and minimum working speeds to a same speed if the maximum and minimum working speeds are different;
(18) calculating a target oil-lifting speed for the VSD as the current oil-lifting speed increased by a first speed incremental value if the PF is greater than or equal to a fourth threshold percentage, or as the current oil-lifting speed increased by a second speed incremental value smaller than the first speed incremental value if the PF is not greater than the fourth threshold percentage;
(19) terminating the optimization of the production well if the target oil-lifting speed is greater than the maximum speed;
(20) calculating a working frequency of the VFD based on the target oil-lifting speed;
(21) setting the speed of the VSD as the calculated working frequency for increasing the production rate;

(22) communicating with the production well and checking if there is any detected rounding issue; and
(23) if a rounding issue is detected, calculating a frequency value from the speed of the VSD, and if the frequency value is greater than a maximum frequency value, reducing the frequency value by a frequency decremental value and proceeding to step (21).

11. The system of claim 7, wherein said slowing-down-production sub-process comprises the steps of:
(24) checking the setting of the production well and determining that the production well is not suitable for optimization if production well is not allowed to decrease the production rate;
(25) checking the second average of PF and if the second average of PF is less than a fifth threshold percentage, generating a report via the reporting sub-process;
(26) if the RPC maximum and minimum working speeds are not same, setting the RPC maximum and minimum working speeds to a same speed;
(27) checking if the second average of THT is greater than the second temperature threshold;
(28) calculating a target oil-lifting speed for the VSD as the current oil-lifting speed decreased by a first speed decremental value and generating a report via the reporting sub-process if the second average of THT is smaller than or equal to the second temperature threshold;
(29) calculating the target oil-lifting speed for the VSD as the current oil-lifting speed decreased by a second speed decremental value that is greater than the first speed decremental value, if the second average of THT is greater than the second temperature threshold and the production well is a slow-category steam breakthrough well;
(30) calculating the target oil-lifting speed for the VSD as the current oil-lifting speed decreased by the second speed decremental value, and generating a report via the reporting sub-process, if the second average of THT is greater than the second temperature threshold, the production well is not a slow-category steam breakthrough well, and the steam-breakthrough interlock is enabled;
(31) triggering the steam-breakthrough interlock, tracking the detection date of steam breakthrough, calculating the target oil-lifting speed for the VSD as the current oil-lifting speed decreased by the second speed decremental value, and generating a report via the reporting sub-process, if the second average of THT is greater than the second temperature threshold, the production well is not a slow-category steam breakthrough well, and the steam-breakthrough interlock is disabled;
(32) terminating the optimization of the production well if the target oil-lifting speed is smaller than the minimum speed;
(33) calculating the working frequency of the VFD based on the target oil-lifting speed;
(34) setting the speed of the VSD as the calculated working frequency for decreasing the production rate;
(35) communicating with the production well and checking if there is any detected rounding issue; and
(36) calculating a frequency value from the speed of the VSD, and if the frequency value is less than a minimum frequency value, increasing the frequency value by a frequency incremental value and proceeding to step (34).

12. A non-transitory computer-readable storage device storing computer-executable code for optimizing one or more oil or gas production wells, each well comprising a corresponding production device, the computer-executable code, when executed, causing at least one processing structure to perform actions comprising: for each well,
(i) collecting data of the well in real-time from one or more sources including one or more of a data historian module, a database, said production devices, a well-status monitoring subsystem, and an input/output interface;
(ii) determining an optimization target based on said data;
(iii) analyzing and diagnosing said data in real-time; (iv) determining whether the production well is suitable for optimization based on the analyzing and diagnosing result, the analyzing and diagnosing result comprising at least one of historical pump efficiency data, variable frequency drive (VFD) motor status, historical tubing-head temperature (THT) data, one or more economical thresholds, basic sediment and water, and tubing-head pressure (THP); and
(v) if the production well is suitable for optimization, optimizing the production well based on at least the historical pump efficiency data by increasing a production rate, decreasing a production rate, maintaining a current production rate, turning-off, or configuring a timer to run or pause the production well at a user-scheduled time and for a user-specified duration;
wherein said historical pump efficiency data comprises historical pump fillage (PF) data; and wherein said determining whether the production well is suitable for optimization comprises the steps of:
(1) communicating with the production well for reading the RPC data and determining that the production well is not suitable for optimization if the production well is not in communication,
(2) calculating a maximum and minimum speeds of a variable frequency drive (VFD) of the production well using a static model and the RPC data;
(3) checking the pump running state and a first average of THT over a first THT-averaging period of time, determining that the production well is not suitable for optimization and disabling the production well if the rod pump is not running in its normal state and the first average of THT is greater than a first temperature threshold, and determining that the production well is not suitable for optimization if the rod pump is not running in its normal state;
(4) checking the validity of the historical data, said historical data comprising the first average of THT and a first average of PF over a first PF-averaging period of time, and determining that the production well is not suitable for optimization if less than a first threshold percentage of the historical data is valid;
(5) checking the validity of the first average of PF and determining that the production well is not suitable for optimization if the first average of PF is not within 0 and 100%;
(6) checking the status of a VFD motor of the production well and determining that the production well is not suitable for optimization if the VFD motor is not in operation;
(7) checking the status of a production device of the production well and determining that the production well is not suitable for optimization if the production device of the production well is not properly functioning;
(8) checking steam-breakthrough interlock, and if the steam-breakthrough interlock has been enabled for at least a predetermined or user-specified steam-breakthrough period of time, disabling the steam-breakthrough interlock and generating a report via the reporting sub-process;

(9) checking if a second average of THT over a second THT-averaging period of time is greater than a second temperature threshold and executing a slowing-down-production sub-process if the second average of THT is greater than the second temperature threshold;

(10) determining that the production well is not suitable for optimization if the first average of PF is less than a second threshold percentage and a second average of PF over a second PF-averaging period of time is greater than a third threshold percentage;

(11) executing the slowing-down-production sub-process if the first average of PF is greater than or equal to the second threshold percentage; (12) checking a current oil-lifting speed and determining that the production well is not suitable for optimization if the current oil-lifting speed is greater than or equal to the calculated maximum speed;

(13) checking the setting of the production well and determining that the production well is not suitable for optimization if production well is not allowed to increase the production rate;

(14) checking the second average of THT and determining that the production well is not suitable for optimization if the second average of THT is less than a third temperature threshold;

(15) checking the status of the steam-breakthrough interlock, determining that the production well is not suitable for optimization if the steam-breakthrough interlock is enabled; and

(16) determining that the production well is suitable for optimization.

13. The non-transitory computer-readable storage device of claim 12, wherein said data comprises at least one of temperature downhole and/or at surface, pressure downhole and/or at surface, pump intake pressure downhole and/or at surface, pump discharge pressure downhole and/or at surface, the one or more economical thresholds, vibration, water cuts, fluid levels, target flow rates or flow rate limitations, pump efficiency, torque, frequency, speed measured in revolutions per minute (rpm) and/or in frequency, startup strategy, gas-to-oil ratio, well integrity, operational requirements and parameters, failure model prediction.

14. The non-transitory computer-readable storage device of claim 12, wherein the step (v) comprises:
if the optimization target is to increase or decrease the current production rate to a target production rate, increasing or decreasing the current production rate by a predefined rate-incremental or rate-decremental, respectively, the rate-incremental or rate-decremental being smaller than what is required for adjusting the current production rate to the target production rate; and the method further comprising:
(vi) repeating steps (i) to (v) until the optimization target is reached.

15. The non-transitory computer-readable storage device of claim 12, wherein the one or more economical thresholds comprise at least one of an oil price, a lifting cost, and a processing cost.

16. The non-transitory computer-readable storage device of claim 12, wherein said optimizing the production well comprises the steps of:

(17) setting the maximum and minimum working speeds to a same speed if the maximum and minimum working speeds are different;

(18) calculating a target oil-lifting speed for the VSD as the current oil-lifting speed increased by a first speed incremental value if the PF is greater than or equal to a fourth threshold percentage, or as the current oil-lifting speed increased by a second speed incremental value smaller than the first speed incremental value if the PF is not greater than the fourth threshold percentage;

(19) terminating the optimization of the production well if the target oil-lifting speed is greater than the maximum speed;

(20) calculating a working frequency of the VFD based on the target oil-lifting speed;

(21) setting the speed of the VSD as the calculated working frequency for increasing the production rate;

(22) communicating with the production well and checking if there is any detected rounding issue; and

(23) if a rounding issue is detected, calculating a frequency value from the speed of the VSD, and if the frequency value is greater than a maximum frequency value, reducing the frequency value by a frequency decremental value and proceeding to step (21).

17. The non-transitory computer-readable storage device of claim 12, wherein said slowing-down-production sub-process comprises the steps of:

(24) checking the setting of the production well and determining that the production well is not suitable for optimization if production well is not allowed to decrease the production rate;

(25) checking the second average of PF and if the second average of PF is less than a fifth threshold percentage, generating a report via the reporting sub-process;

(26) if the RPC maximum and minimum working speeds are not same, setting the RPC maximum and minimum working speeds to a same speed;

(27) checking if the second average of THT is greater than the second temperature threshold;

(28) calculating a target oil-lifting speed for the VSD as the current oil-lifting speed decreased by a first speed decremental value and generating a report via the reporting sub-process if the second average of THT is smaller than or equal to the second temperature threshold;

(29) calculating the target oil-lifting speed for the VSD as the current oil-lifting speed decreased by a second speed decremental value that is greater than the first speed decremental value, if the second average of THT is greater than the second temperature threshold and the production well is a slow-category steam breakthrough well;

(30) calculating the target oil-lifting speed for the VSD as the current oil-lifting speed decreased by the second speed decremental value, and generating a report via the reporting sub-process, if the second average of THT is greater than the second temperature threshold, the production well is not a slow-category steam breakthrough well, and the steam-breakthrough interlock is enabled;

(31) triggering the steam-breakthrough interlock, tracking the detection date of steam breakthrough, calculating the target oil-lifting speed for the VSD as the current oil-lifting speed decreased by the second speed decremental value, and generating a report via the reporting sub-process, if the second average of THT is greater than the second temperature threshold, the production well is not a slow-category steam breakthrough well, and the steam-breakthrough interlock is disabled;

(32) terminating the optimization of the production well if the target oil-lifting speed is smaller than the minimum speed;

(33) calculating the working frequency of the VFD based on the target oil-lifting speed;

(34) setting the speed of the VSD as the calculated working frequency for decreasing the production rate;

(35) communicating with the production well and checking if there is any detected rounding issue; and

(36) calculating a frequency value from the speed of the VSD, and if the frequency value is less than a minimum frequency value, increasing the frequency value by a frequency incremental value and proceeding to step (34).

* * * * *